United States Patent
Chen et al.

(10) Patent No.: US 12,253,710 B2
(45) Date of Patent: Mar. 18, 2025

(54) BACKLIGHT MODULE AND DISPLAY DEVICE

(71) Applicant: Coretronic Corporation, Hsin-Chu (TW)

(72) Inventors: Ying-Hsiang Chen, Hsin-Chu (TW); Ping-Yen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/421,833

(22) Filed: Jan. 24, 2024

(65) Prior Publication Data

US 2024/0295686 A1 Sep. 5, 2024

(30) Foreign Application Priority Data

Mar. 3, 2023 (CN) .......................... 202320382529.9

(51) Int. Cl.
*F21V 8/00* (2006.01)
*G02F 1/1335* (2006.01)
*G02F 1/13357* (2006.01)

(52) U.S. Cl.
CPC ..... *G02B 6/0053* (2013.01); *G02F 1/133615* (2013.01); *G02F 1/133626* (2021.01)

(58) Field of Classification Search
CPC ............. G02B 6/0053; G02F 1/133615; G02F 1/133626
See application file for complete search history.

(56) References Cited

U.S. PATENT DOCUMENTS

| | | | | |
|---|---|---|---|---|
| 5,956,107 A * | 9/1999 | Hashimoto | .......... | G02B 6/0036 |
| | | | | 362/616 |
| 9,599,830 B2 * | 3/2017 | Wu | ........................ | G09G 3/003 |
| 10,036,846 B2 * | 7/2018 | Lee | ...................... | G02B 6/0055 |
| 11,150,399 B2 * | 10/2021 | Liao | ...................... | G02B 6/0051 |
| 2008/0112187 A1 * | 5/2008 | Katsumata | ........... | G02B 6/0076 |
| | | | | 362/611 |
| 2008/0198295 A1 * | 8/2008 | Yuuki | .................. | G02B 6/0053 |
| | | | | 362/235 |
| 2009/0067156 A1 * | 3/2009 | Bonnett | ................ | G02F 1/1323 |
| | | | | 362/97.2 |
| 2017/0153383 A1 * | 6/2017 | Lee | ...................... | G02B 6/0068 |
| 2021/0191027 A1 * | 6/2021 | Liao | ..................... | G02B 6/0053 |
| 2021/0286214 A1 * | 9/2021 | Chen | .................... | G02B 6/0051 |

FOREIGN PATENT DOCUMENTS

| | | |
|---|---|---|
| CN | 106802499 | 6/2017 |
| CN | 113655558 | 8/2022 |
| TW | I300500 | 9/2008 |
| TW | I754318 | 2/2022 |
| TW | I764775 | 5/2022 |

\* cited by examiner

*Primary Examiner* — Tsion Tumebo
(74) *Attorney, Agent, or Firm* — JCIPRNET

(57) ABSTRACT

A backlight module including a first light emitting unit, a first light guide plate, a second light emitting unit, a second light guide plate and a light control film is provided. The first light emitting unit is disposed on a first side surface of the first light guide plate. The second light emitting unit is disposed on a second side surface of the second light guide plate. The light control film is disposed between the first light guide plate and the second light guide plate. The light control film has a plurality of light-shielding microstructures arranged along a first direction and extending along a second direction. The first direction is perpendicular to the second direction.

13 Claims, 22 Drawing Sheets

BACKLIGHT MODULE AND DISPLAY DEVICE

CROSS-REFERENCE TO RELATED APPLICATION

This application claims the priority benefit of China application serial no. 202320382529.9 filed on Mar. 3, 2023. The entirety of the above-mentioned patent application is hereby incorporated by reference herein and made a part of this specification.

BACKGROUND

Technical Field

The invention relates to a light-emitting module and an electronic device and particularly relates to a backlight module and a display device.

Description of Related Art

Liquid crystal display includes a liquid crystal display panel, and since the liquid crystal display panel itself is not capable of emitting light, the liquid crystal display panel must rely on a backlight module to provide an area light source to the liquid crystal display panel, so that users may watch images displayed by the liquid crystal display panel.

At present, when the display has anti-peeping requirements, a piece of anti-peeping sheet is usually placed on the top of the display to filter out large angle light, or a liquid crystal box with anti-peeping switch is used to change a liquid crystal alignment direction by applying a voltage, such that a phase value of each viewing angle is changed, and accordingly the brightness of different viewing angles is changed to achieve an anti-peeping effect. However, in this method, the anti-peeping sheet must be manually placed on or removed from the surface of the display, which is likely to cause inconvenience in use. Moreover, the brightness of the display using this method will be greatly reduced due to the configuration of the anti-peeping sheet or the liquid crystal box. In addition, the anti-peeping sheet or liquid crystal box may easily affect the display to produce an interference phenomenon, resulting in poor display effect.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a backlight module and a display device, which are adapted to be easily switched to a sharing mode or an anti-peeping mode without additional configuration of an anti-peeping optical element on the display device, so as to maintain a good display brightness of the display device and avoid the optical interference phenomenon produced by configuration of the anti-peeping optical element.

Additional aspects and advantages of the present invention will be set forth in the description of the techniques disclosed in the present invention.

In order to achieve one or a portion of or all of the objects or other objects, an embodiment of the invention provides a backlight module including a first light emitting unit, a first light guide plate, a second light emitting unit, a second light guide plate and a light control film. The first light emitting unit is disposed on a first side surface of the first light guide plate. The second light emitting unit is disposed on a second side surface of the second light guide plate. The light control film is disposed between the first light guide plate and the second light guide plate. The light control film has a plurality of light-shielding microstructures arranged along a first direction and extending along a second direction. The first direction is perpendicular to the second direction.

In order to achieve one or a portion of or all of the objects or other objects, an embodiment of the invention provides a display device configured to provide a display light beam. The display device includes a backlight module and a display module. The backlight module includes a first light emitting unit, a first light guide plate, a second light emitting unit, a second light guide plate and a light control film. The first light emitting unit is disposed on a first side surface of the first light guide plate. The second light emitting unit is disposed on a second side surface of the second light guide plate. The light control film is disposed between the first light guide plate and the second light guide plate. The light control film has a plurality of light-shielding microstructures arranged along a first direction and extending along a second direction. The first direction is perpendicular to the second direction. The display module is disposed on a side of the first light guide plate away from the light control film.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
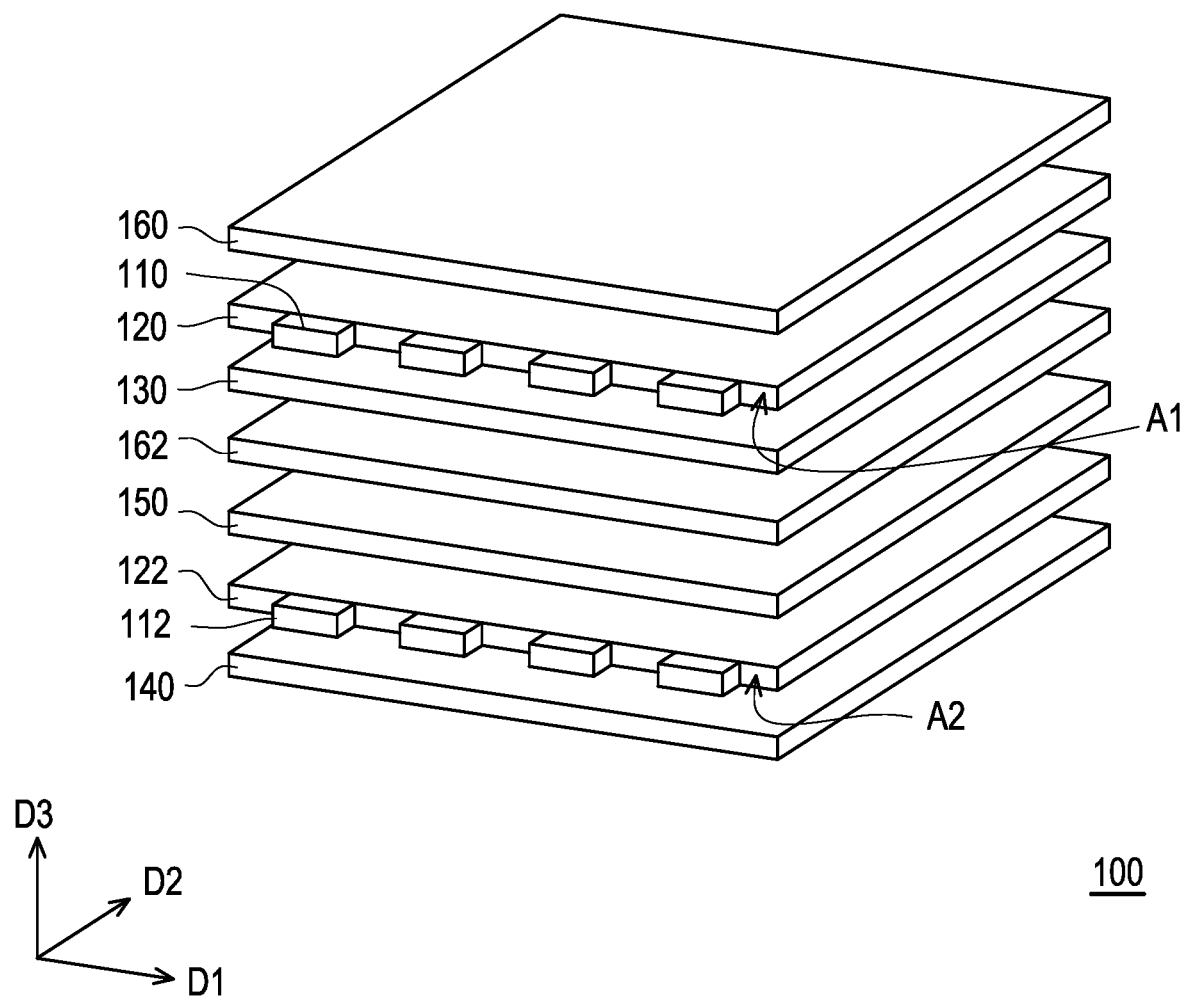
FIG. 1 is a schematic diagram of a backlight module according to an embodiment of the invention.

FIG. 1 is a schematic diagram of a backlight module according to an embodiment of the invention. Referring to FIG. 1, this embodiment provides a backlight module 100, which may be applied to a display device, such as a liquid crystal display, for example, a vehicle-type liquid crystal display, but the invention is not limited thereto. The backlight module 100 includes a first light emitting unit 110, a first light guide plate 120, a second light emitting unit 112, a second light guide plate 122 and a light control film 130. The first light emitting unit 110 is arranged on a first side surface A1 of the first light guide plate 120, the second light emitting unit 112 is arranged on a second side surface A2 of the second light guide plate 122, and in the embodiment, the first side surface A1 is parallel to the second side surface A2.

Figure 2A:
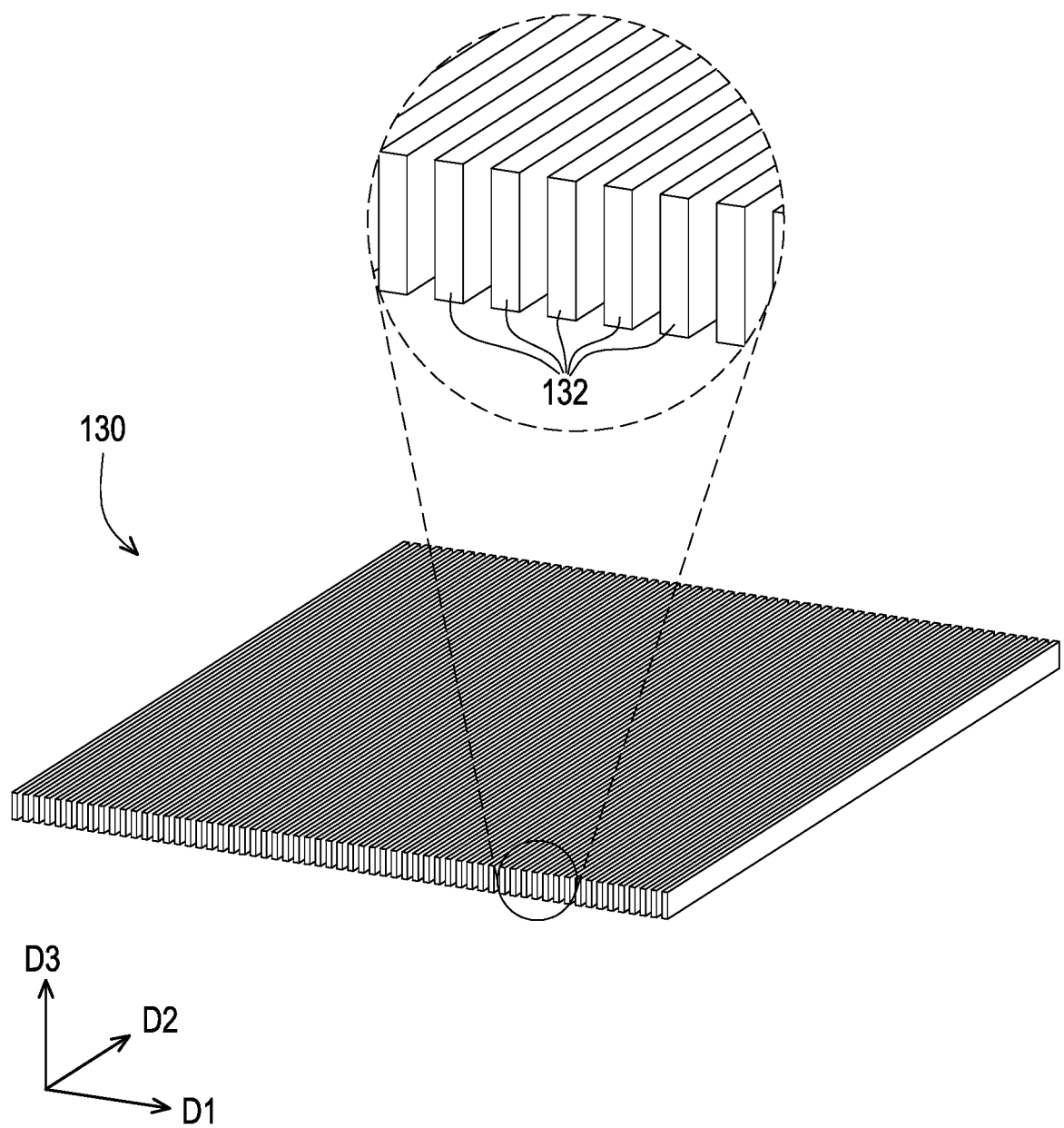
FIG. 2A is a schematic diagram of a light control film according to an embodiment of the invention.
Figure 2B:
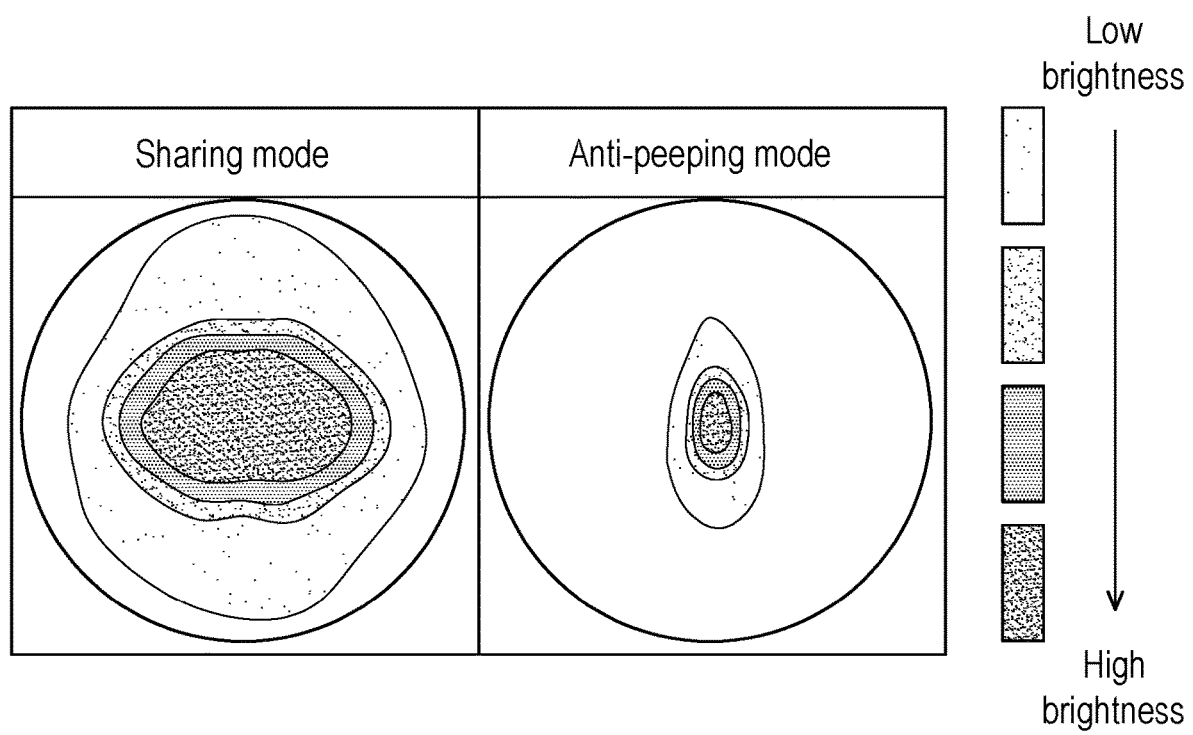
FIG. 2B is an isoluminance perspective view of the backlight module of FIG. 1 respectively in a sharing mode and an anti-peeping mode.

FIG. 2A is a schematic diagram of a light control film according to an embodiment of the invention. FIG. 2B is an isoluminance perspective view of the backlight module of FIG. 1 respectively in a sharing mode and an anti-peeping mode. Referring to FIG. 1 to FIG. 2B at the same time, the light control film 130 shown in FIG. 2A may be at least applied to the backlight module 100 shown in FIG. 1, which may be taken as an example in the following description. As mentioned above, the light control film 130 is disposed between the first light guide plate 120 and the second light guide plate 122. The light control film 130 has a plurality of light-shielding microstructures 132 arranged at intervals along a first direction D1 and extending along a second direction D2. Where, the first direction D1 is perpendicular to the second direction D2. In a display device, the first direction D1 is a horizontal viewing direction, the second direction D2 is a vertical viewing direction, and the second direction D2 is perpendicular to the first side surface A1 of the first light guide plate 120. There is a gap between two adjacent light-shielding microstructures 132, where the gap may be a hollow area of the light control film 130 or a light-transmitting material for light transmission. Therefore, based on a light-shielding effect of the multiple light-shielding microstructures 132, a light intensity of a light beam in a large horizontal viewing angle may be effectively reduced after the light beam passes through the light control film 130, thereby achieving the anti-peeping effect. For example, in the embodiment, the light intensity of the light beam passing through the light control film 130 in a horizontal viewing angle greater than 30 degrees or less than negative 30 degrees is less than 20% of the light intensity of the light beam on a main optical axis, which achieves a good anti-peep effect of the horizontal viewing angle. In different embodiments, the plurality of light-shielding microstructures 132 may be designed to be arranged along the second direction D2 and extend along the first direction D1, so as to achieve the anti-peeping effect of a vertical viewing angle, which is not limited by the invention.

In the embodiment, the backlight module 100 sequentially includes the second light guide plate 122, the light control film 130 and the first light guide plate 120 along a third direction D3, where the third direction D3 is a light output direction of the backlight module 100, and the third direction D3 is perpendicular to the first direction D1 and the second direction D2. Therefore, when only the first light guide plate 120 is lighted or the first light guide plate 120 and the second light guide plate 122 are lighted at the same time, the display device may be in the sharing mode, and the light beam may be emitted from the first light guide plate 120, so that a display image has a certain level of light intensity at the large horizontal viewing angle. When only the second light guide plate 122 is lighted, the display device may be in the anti-peeping mode, and the light intensity of the display image in the large horizontal viewing angle is effectively reduced by an optical effect of the light control film 130, so as to achieve a good anti-peeping effect. As shown in FIG. 2B, it should be further explained that in FIG. 2B, the denser the distribution of grid dots in the grid base pattern is, the higher the value range of the light field energy value is (i.e., the area has higher brightness value). In this way, the display device using the backlight module 100 of the embodiment may be conveniently switched to the sharing mode or the anti-peeping mode without additionally configuring anti-peeping optical element on the display, which may maintain a good display brightness of the display device and avoid the optical interference phenomenon produced by configuration of the anti-peeping optical element.

Referring to FIG. 1, to be specific, in the embodiment, the backlight module 100 further includes a reflector 140, and the second light guide plate 122 is located between the first light guide plate 120 and the reflector 140. The reflector 140 is used to reflect light beams emitted from the first light guide plate 120 or the second light guide plate 122 in a direction opposite to the third direction D3, so as to improve usage efficiency of the light beams.

In addition, in the embodiment, at least one upper layer optical film may be disposed on the side of the first light guide plate 120 away from the light control film 130, and at least two lower layer optical films may be disposed between the first light guide plate 120 and the second light guide plate 122. For example, in the embodiment, the backlight module 100 further includes a first diffuser 150 disposed between the light control film 130 and the second light guide plate 122 to improve uniformity of the light beam from the second light guide plate 122, wherein the first diffuser 150 may be an anisotropic diffuser or a micro-lens structural film, adapted to deflect the light with a larger viewing angle emitted from the second light guide plate 122 toward the direction of the positive viewing angle, so that the light in the direction without adjusting the viewing angle has a smaller degree of deviation. In addition, the backlight module 100 further includes a first prism sheet 160 and a second prism sheet 162, the first prism sheet 160 is located on the side of the first light guide plate 120 away from the light control film 130, and the second prism sheet 162 is located between the light control film 130 and the second light guide plate 122. The first prism sheet 160 and the second prism sheet 162 are used to increase the central light intensity of the backlight module 100. The first prism sheet 160 has a first prism structure (not shown) on the side away from the first light guide plate 120, and the second prism sheet 162 has a second prism structure (not shown) on the side away from the second light guide plate 122, and an extending direction of the first prism structure is substantially perpendicular to an extending direction of the second prism structure. For example, an angle range of an included angle between the extending direction of the first prism structure and the extending direction of the second prism structure is 75 to 105 degrees. For example, in the embodiment, the extending direction of the first prism structure of the first prism sheet 160 is parallel to the first direction D1, while the extending direction of the second prism structure of the second prism sheet 162 is parallel to the second direction D2. If the extending direction of the prism structure parallel to the first direction D1 is defined as placement 0 degree, and the extending direction of the prism structure parallel to the second direction D2 is defined as placement 90 degrees, in the embodiment, the first prism structure of the first prism sheet 160 may be placement 0 degree, and the second prism structure of the second prism sheet 162 may be placement 90 degrees. In this way, a good optical effect is achieved. It should be further explained that the vertex angle of the first prism structure of the first prism sheet 160 ranges from 60 to 150 degrees. For example, the vertex angle of the first prism structure may be 90 degrees. In addition, the vertex angle of the second prism structure of the second prism sheet 162 ranges from 60 to 150 degrees. For example, the vertex angle of the second prism structure can be 90 degrees. The vertex angles of the first prism structure and the second prism structure are not limited to be the same. In addition, the angle design of the vertex angle depends on whether the refractive index of the optical material used to make the prism structure and the above structure can guide the light to the target viewing angle, such as the front viewing angle.

Figure 3A:
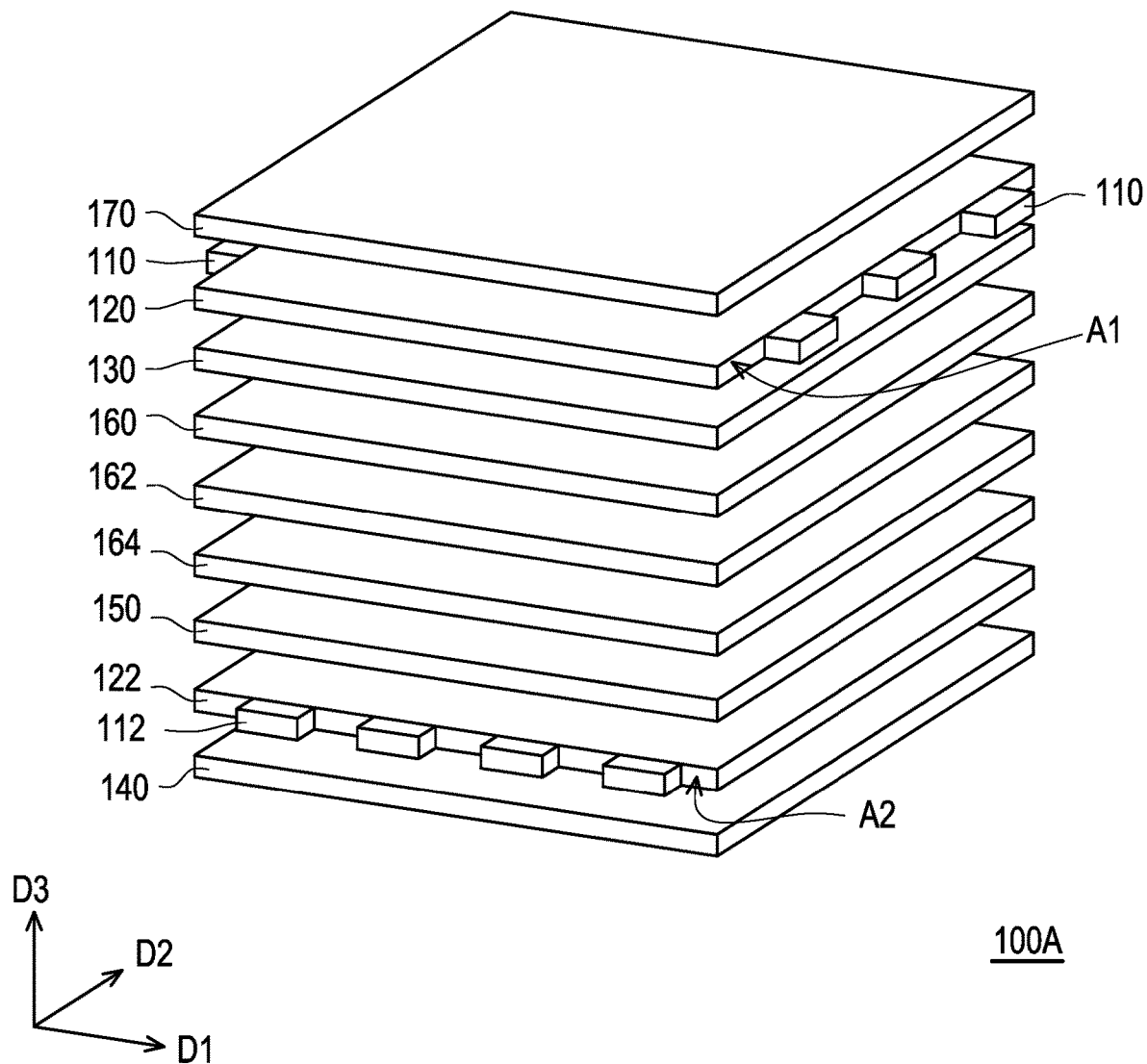
FIG. 3A is a schematic diagram of a backlight module according to another embodiment of the invention.
Figure 3B:
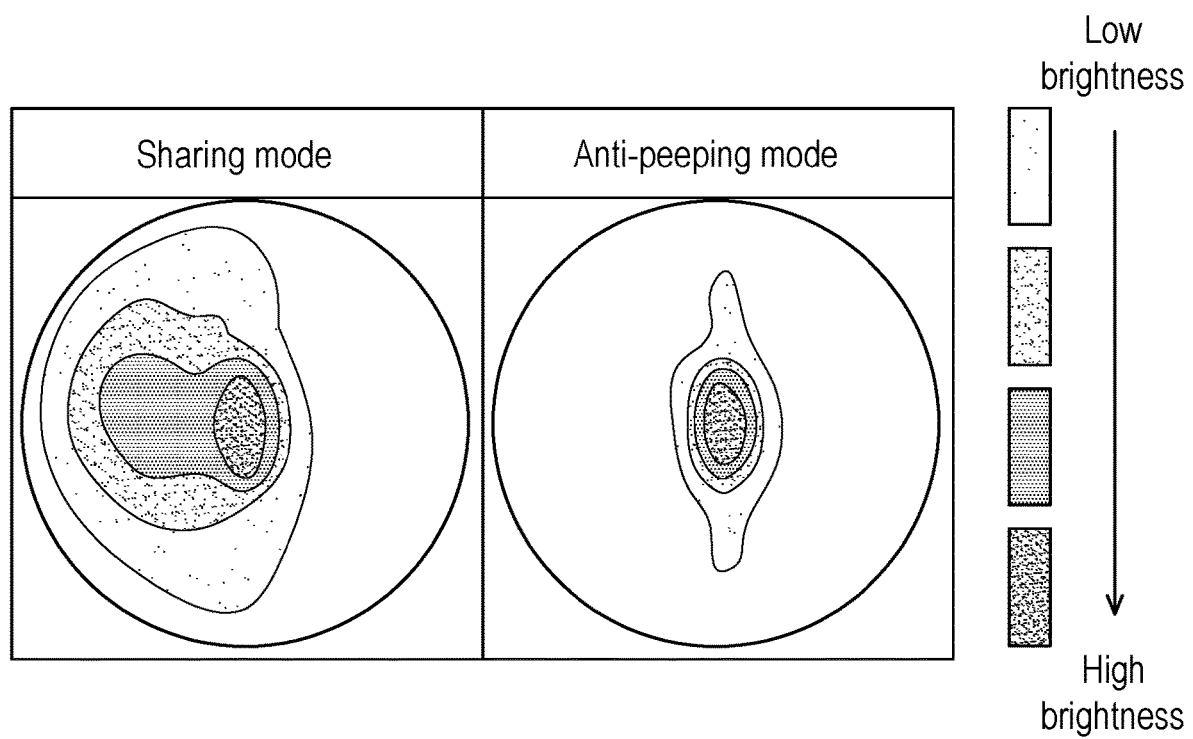
FIG. 3B is an isoluminance perspective view of the backlight module of FIG. 1 respectively in the sharing mode and the anti-peeping mode.

FIG. 3A is a schematic diagram of a backlight module according to another embodiment of the invention. FIG. 3B is an isoluminance perspective view of the backlight module of FIG. 1 respectively in the sharing mode and the anti-peeping mode. Referring to FIG. 3A and FIG. 3B, a backlight module 100A of the embodiment is similar to the backlight module 100 shown in FIG. 1, and a difference there between is that, in the embodiment, the first side surface A1 is perpendicular to the second side surface A2. For example, in the embodiment, a long side of the first side surface A1 of the first light guide plate 120 is parallel to the second direction D2, so that the first light emitting unit 110 provides the light beam to the first light guide plate 120 from a side edge along the horizontal direction. For example, in the embodiment, the first light emitting units 110 are respectively disposed on two opposite two sides of the first light guide plate 120. Therefore, when the first light guide plate 120 is lighted, the display device may be in the sharing mode, and the light beam may be emitted from the first light guide plate 120, so that the display image has a certain level of light intensity at the large horizontal viewing angle. Besides, a user may selectively activate the first light emitting unit 110 located on one of the side surfaces of the first light guide plate 120 to emit light, so as to provide a light pattern adapted to view a left or right side in the horizontal viewing angle to achieve a better sharing effect, as shown in FIG. 3B. It should be further explained that in FIG. 3B, the areas filled with the same grid base pattern represent value ranges with similar light field energy values, and the denser the distribution of grid dots in the grid base pattern is, the higher the value range of the light field energy value is (i.e., the area has higher brightness value).

For example, in a vehicle display, when the backlight module 100A of the embodiment is in the sharing mode, only the first light emitting unit 110 on the right side may be turned on so that the user on the left side (for example, a driver) may watch a display image. Alternatively, only the first light emitting unit 110 on the left side may be turned on so that the user on the right side (for example, user on the passenger seat) may watch the display image. Alternatively, the first light emitting units 110 on the left and right sides may be turned on at the same time, so that the users on both of the left and right sides may watch the display image. When only the second light guide plate 122 is lighted, the display device may be in the anti-peeping mode, and the light intensity of the display image in the large horizontal viewing angle will be effectively reduced by the optical effect of the light control film 130, so as to achieve good anti-peeping effect. In this way, the display device using the backlight module 100A of the embodiment may be conveniently switched to the sharing mode or the anti-peeping mode without additional configuring anti-peeping optical elements on the display, which may maintain a good display brightness of the display device and avoid the optical interference phenomenon produced by configuration of the anti-peeping optical elements.

In addition, in the embodiment, one side of the first light guide plate 120 away from the light control film 130 may be selectively configured with an upper layer optical film, and at least two lower layer optical films may be configured between the first light guide plate 120 and the second light guide plate 122. For example, compared with the backlight module 100 of FIG. 1, the backlight module 100A of the embodiment further includes a first reflective brightness enhancement film 170, and the first reflective brightness enhancement film 170 may be a dual brightness enhancement film (DBEF) or ab advanced polarization conversion film (APCF), which is configured on one side of the first light guide plate 120 away from the light control film 130 to improve the brightness and visual effect in the sharing mode. In addition, the first prism sheet 160 and the second prism sheet 162 of the backlight module 100A are respectively disposed between the light control film 130 and the second light guide plate 122 and between the first prism sheet 160 and the second light guide plate 122. Wherein, the extending direction of the first prism structure of the first prism sheet 160 is roughly perpendicular to the extending direction of the second prism structure of the second prism sheet 162. For example, the angle between the extension direction of the first prism structure and the extension direction of the second prism structure ranges from 75 to 105 degrees. For example, in the embodiment, one side of the first prism sheet 160 facing the first light guide plate 120 has the first prism structure (not shown), and one side of the second prism sheet 162 away from the second light guide plate 122 has the second prism structure (not shown), where the extending direction of the first prism structure of the first prism sheet 160 is parallel to the second direction D2, and the extending direction of the second prism structure of the second prism sheet 162 is parallel to the first direction D1. Besides, in the embodiment, the backlight module 100A further includes a third prism sheet 164 disposed between the second prism sheet 162 and the second light guide plate 122. One side of the third prism sheet 164 facing the second light guide plate 122 has a third prism structure, for example, a reverse prism sheet. It should be further explained that the third prism structure of the third prism sheet 164 can also be a forward prism sheet. That is, the third prism structure can be disposed on the side of the third prism sheet 164 facing the first light guide plate 120. An extending direction of the third prism structure may be substantially parallel to the extending direction of the first prism structure. For example, the angle between the extension direction of the first prism structure and the extension direction of the third prism structure ranges from 15 to 315 degrees. That is, the extending direction of the third prism structure may be substantially parallel to the second direction D2. If the extending direction of the prism structure parallel to the first direction D1 is defined as placement 0 degree, and the extending direction of the prism structure parallel to the second direction D2 is defined as placement 90 degrees, in the embodiment, the first prism structure of the first prism sheet 160 is the placement 90 degrees, the second prism structure of the second prism sheet 162 is the placement 0 degree, and the third prism structure of the third prism sheet 164 is the placement 90 degrees. Moreover, the extending direction of the third prism structure may be roughly perpendicular to the extending direction of the first prism structure. For example, the angle between the extension direction of the first prism structure and the extension direction of the third prism structure ranges from 75 to 105 degrees. That is, the extending direction of the third prism structure may be substantially parallel to the first direction D1. If the extending direction of the prism structure parallel to the first direction D1 is defined as the placement 0 degree, and the extending direction of the prism structure parallel to the second direction D2 is defined as the placement 90 degrees, in the embodiment, the first prism structure of the first prism sheet 160 is the placement 0 degree, the second prism structure of the second prism sheet 162 is the placement 90 degrees, and the third prism structure of the third prism sheet 164 is the placement 90 degrees. In this way, good optical effect is achieved. It is should be noted that the third prism sheet 164 may also be disposed between the second prism sheet 162 and the second light guide plate 122 in the backlight module 100 shown in FIG. 1, but the invention is not limited thereto. The vertex angle of the first prism structure of the first prism sheet 160 ranges from 60 to 150 degrees. For example, the vertex angle of the first prism structure can be 90 degrees. The vertex angle of the second prism structure of the second prism sheet 162 ranges from 60 to 150 degrees. For example, the vertex angle of the second prism structure can be 90 degrees. The vertex angle of the third prism structure of the third prism sheet 164 ranges from 60 to 150 degrees. For example, the vertex angle of the third prism structure can be 90 degrees. The vertex angles of the first prism structure, the second prism structure and the third prism structure are not limited to be the same. In addition, the angle design of the vertex angle depends on whether the refractive index of the optical material used to make the prism structure and the above structure can guide the light to the target viewing angle, such as the front viewing angle. If the extending direction of the prism structure parallel to the first direction D1 is defined as the placement 0 degree, and the extending direction of the prism structure parallel to the second direction D2 is defined as the placement 90 degrees, when the prism structure of the two prism sheets are placed at 0 degree, one of the prism sheet can be replaced with an anisotropic diffusion sheet or a micro-lens structure film. For example, if the first prism structure of first prism sheet 160 is placed at 0 degree, the second prism structure of second prism sheet 162 is placed at 90 degrees, and the third prism structure of third prism sheet 164 is placed at 0 degree, then one of the first prism sheet 160 and the third prism sheet 164 can be replaced with an anisotropic diffusion sheet or a micro-lens structure film.

It should be further explained that the backlight module 100A shown in FIG. 3A may include a reflector 140 and a diffuser 150. The reflector 140 is located on one side of the second light guide plate 122 away from the first light guide plate 120, and the diffuser 150 is located between the second light guide plate 122 and the lower layer optical film.

Figure 3C:
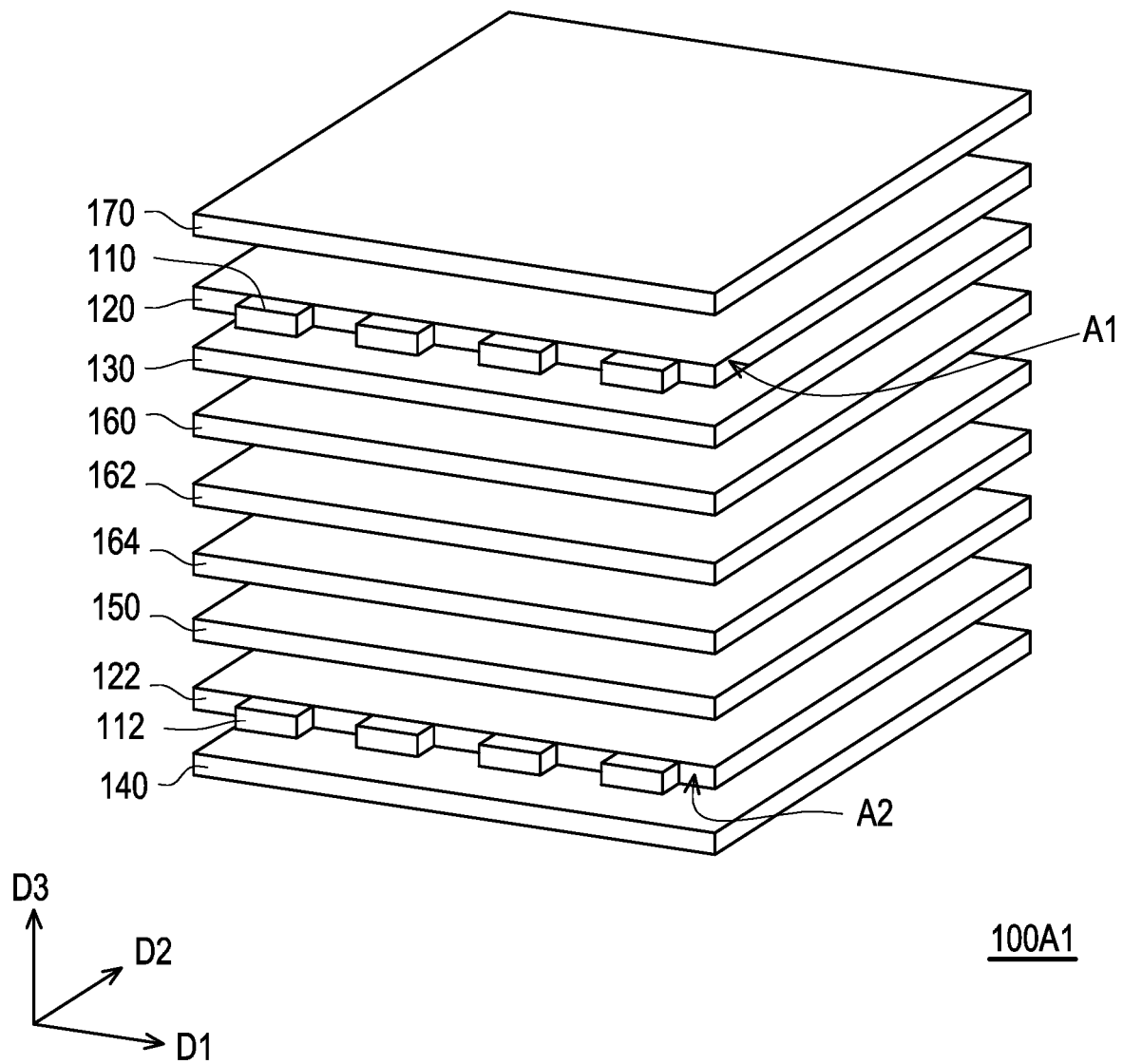
FIG. 3C is a schematic diagram of a backlight module according to another embodiment of the invention.

FIG. 3C is a schematic diagram of a backlight module according to another embodiment of the invention. Referring to FIG. 3C, a backlight module 100A1 of the embodiment is similar to the backlight module 100A shown in FIG. 3A, and a difference there between is that, in the embodiment, the arrangement of the first light emitting unit 110 and the first light guide plate 120 of the backlight module 100A1 adopts the arrangement of the backlight module 100 of FIG. 1. In other words, the first light emitting unit 110 and the second light emitting unit 112 are disposed on a same side of the backlight module 100A1. In this way, an optical effect similar to that of the backlight module 100 in FIG. 1 may be obtained, but the invention is not limited thereto.

Figure 4:
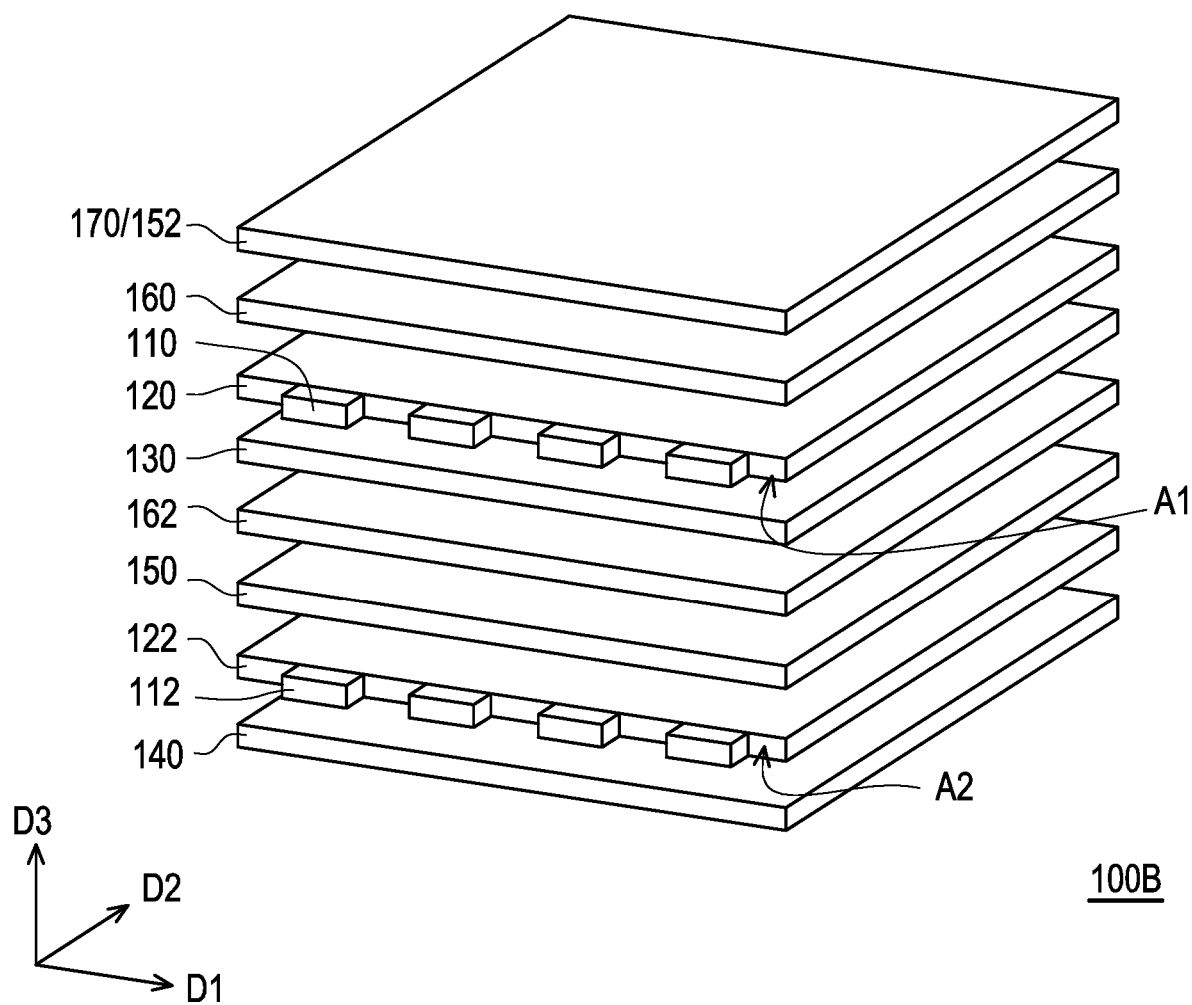
FIG. 4 is a schematic diagram of a backlight module according to another embodiment of the invention.
Figure 5:
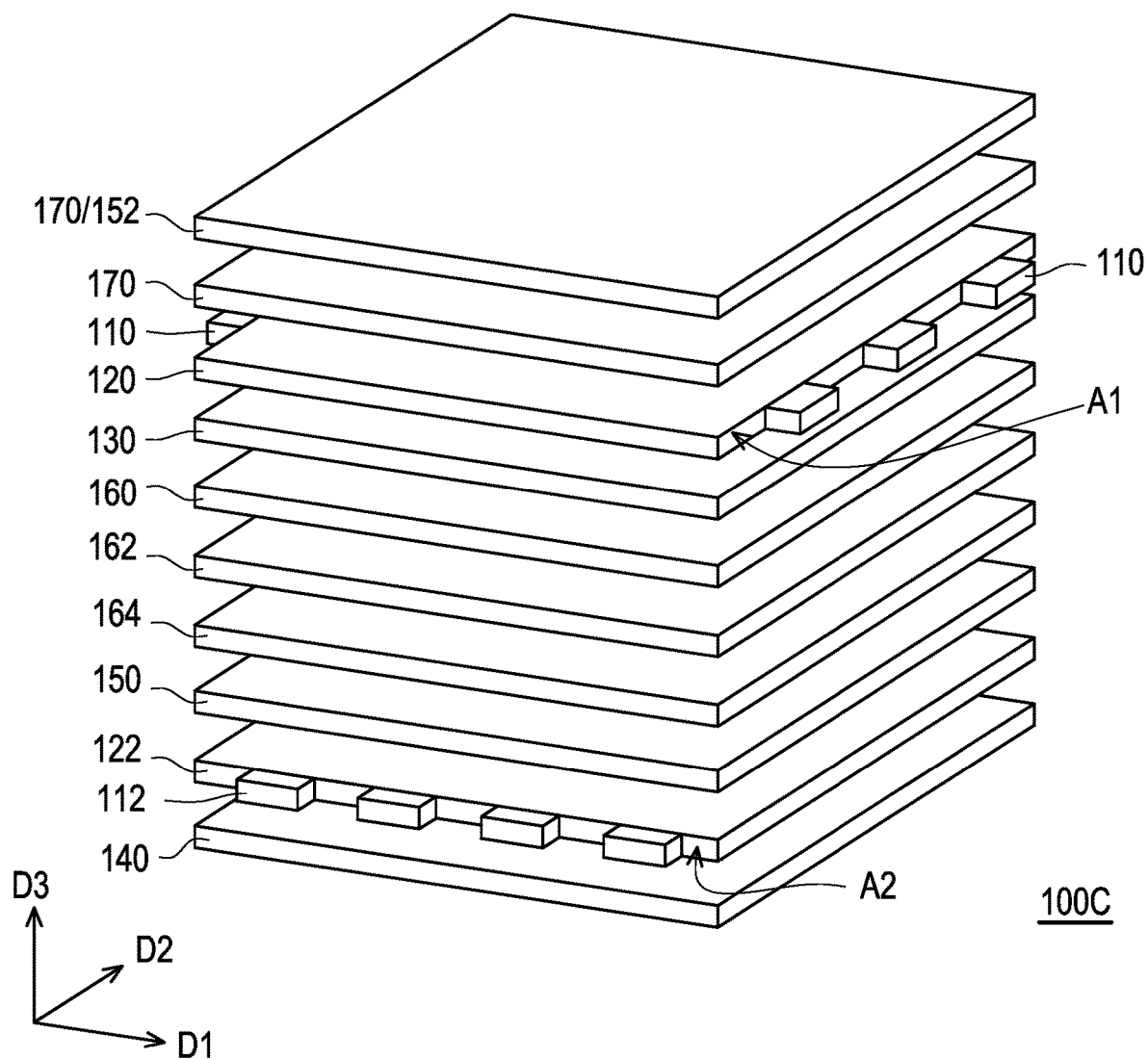
FIG. 5 is a schematic diagram of a backlight module according to another embodiment of the invention.

FIG. 4 is a schematic diagram of a backlight module according to another embodiment of the invention. FIG. 5 is a schematic diagram of a backlight module according to another embodiment of the invention. Referring to FIG. 4 first, a backlight module 100B of the embodiment is similar to the backlight module 100 shown in FIG. 1. A difference there between is that in the embodiment, the backlight module 100B further includes a first reflective brightness enhancement film 170 or a second diffuser 152 disposed on the side of the first light guide plate 120 away from the light control film 130 to enhance a brightness and visual effect in the sharing mode. In detail, the first reflective brightness enhancement film 170 or the second diffuser 152 may be disposed on a side of the first prism sheet 160 away from the first light guide plate 120, or disposed between the first prism sheet 160 and the first light guide plate 120. In the embodiment, the second diffusion sheet 152 may be an anisotropic diffuser, so that a diffusing direction thereof is perpendicular to an anti-peeping direction, so as to maintain a good optical effect in the anti-peeping mode. It should be further explained that in the embodiment, a multi-function film may also be selected to be arranged on the side of the first light guide plate 120 away from the light control film 130. This multi-function film includes the technical features of the first prism sheet 160 and the second diffuser 152. Therefore, if the multi-function film is configured, the first prism sheet 160 does not need to be additionally configured. Similar to the difference between the backlight module 100 of FIG. 1 and the backlight module 100B of FIG. 4, regarding a backlight module 100C shown in FIG. 5, the backlight module 100A of FIG. 3A may be modified according to the implementation of the embodiment of FIG. 4 to obtain the backlight module 100C of FIG. 5, but the invention is not limited thereto.

Figure 6:
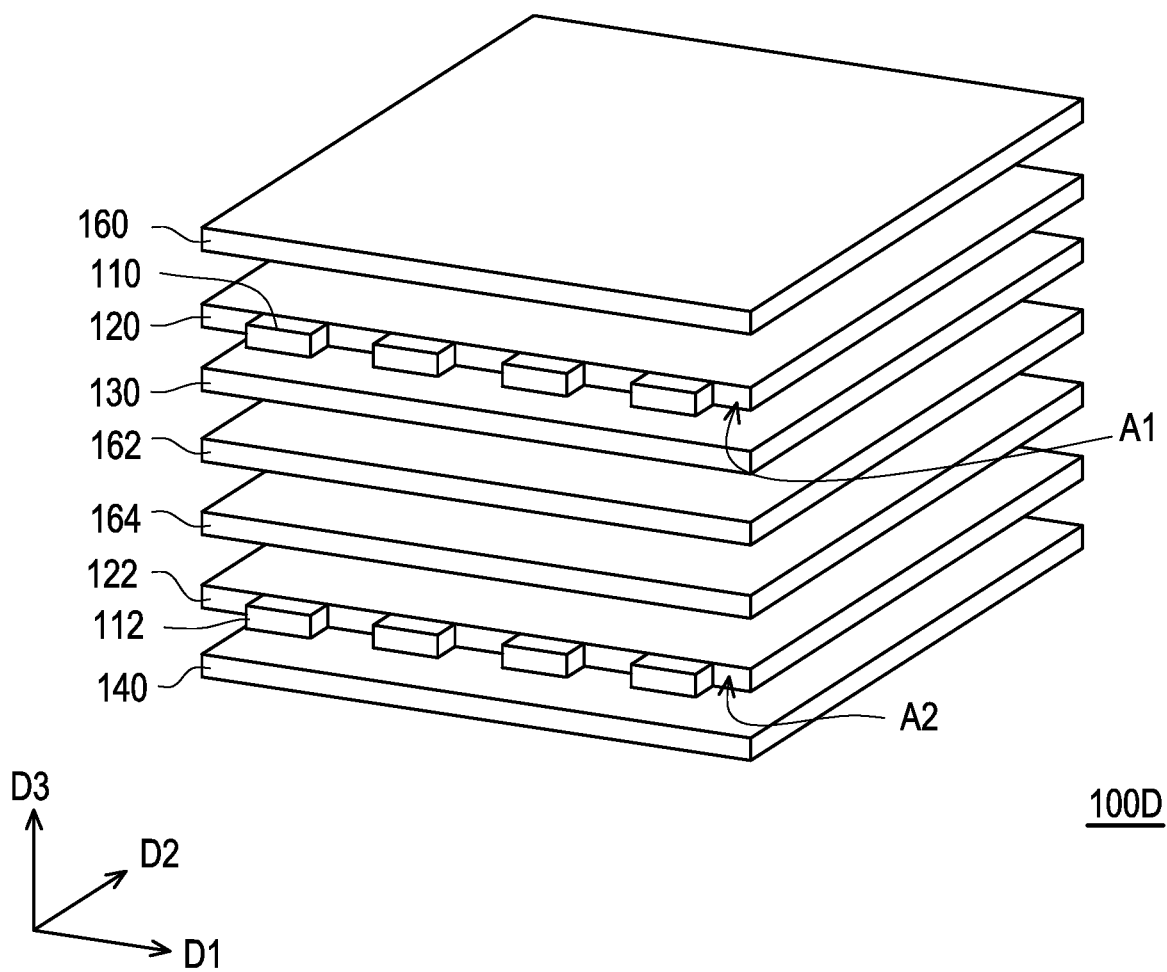
FIG. 6 is a schematic diagram of a backlight module according to another embodiment of the invention.
Figure 7:
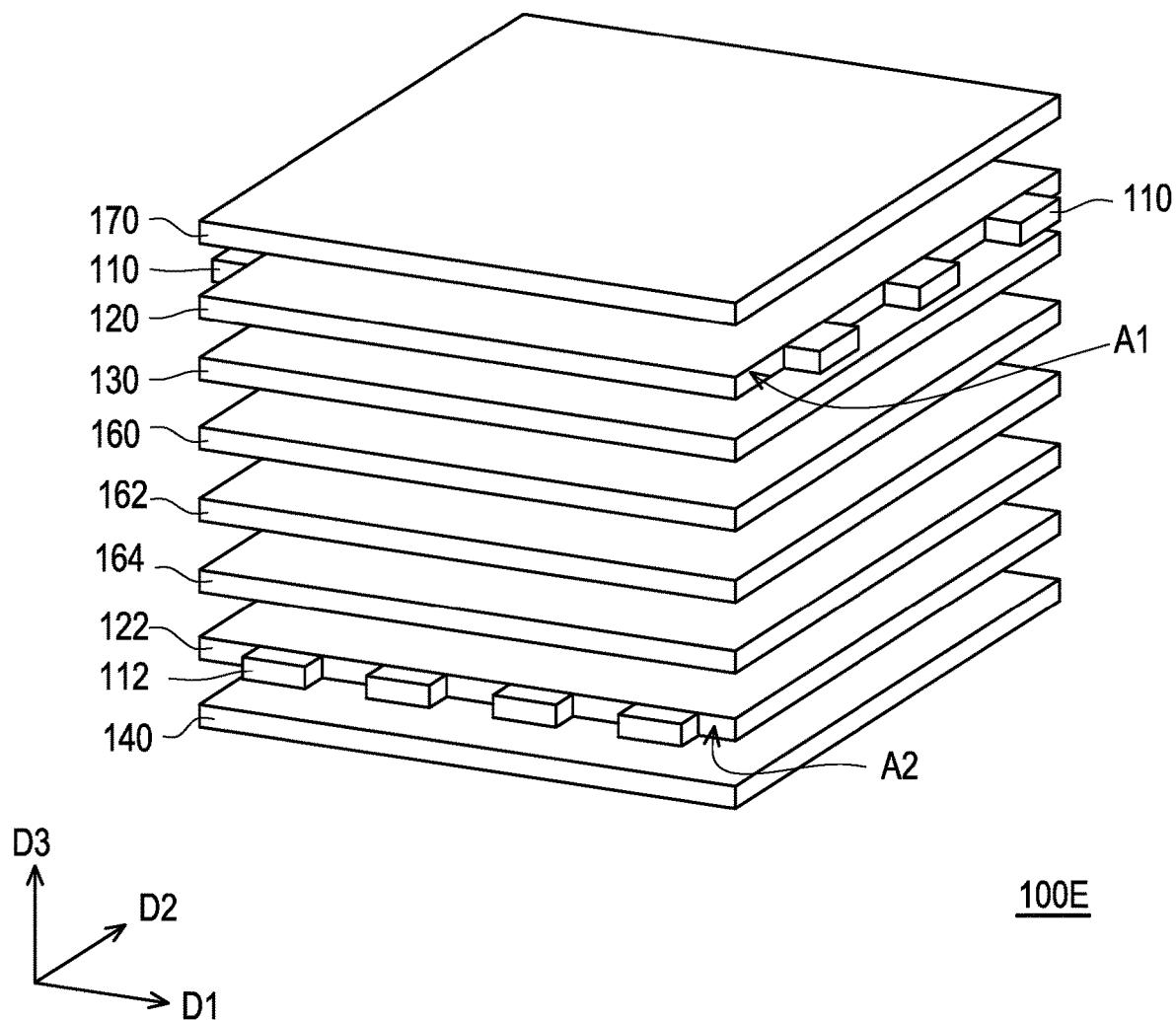
FIG. 7 is a schematic diagram of a backlight module according to another embodiment of the invention.

FIG. 6 is a schematic diagram of a backlight module according to another embodiment of the invention. FIG. 7 is a schematic diagram of a backlight module according to another embodiment of the invention. Referring to FIG. 6 first, a backlight module 100D of the embodiment is similar to the backlight module 100 shown in FIG. 1. A difference there between is that in the embodiment, a vertex angle of the first prism structure of the first prism sheet 160 of the backlight module 100D is between 40 and 80 degrees, and a vertex angle of the second prism structure of the second prism sheet 162 is between 70 and 120 degrees. Moreover, the backlight module 100D further includes a third prism sheet 164 as shown in FIG. 3A, for example, a reverse prism sheet 164 disposed between the second prism sheet 162 and the second light guide plate 122. However, it should be noted that the backlight module 100D is not configured with the first diffuser 150. Through the above structural configuration, a narrower viewing angle may be generated in the anti-peeping mode, resulting in better optical effects.

Similar to the difference between the backlight module 100 of FIG. 1 and the backlight module 100D of FIG. 6, regarding a backlight module 100E shown in FIG. 7, the backlight module 100A of FIG. 3A may be modified according to the implementation of the embodiment of FIG. 6 to obtain the backlight module 100E of FIG. 7, but the invention is not limited thereto. For example, a vertex angle of the first prism structure of the first prism sheet 160 of the backlight module 100E is between 70 and 120 degrees, and an angle range of a vertex angle of the second prism structure of the second prism sheet 162 is between 40 and 80 degrees.

Figure 8:
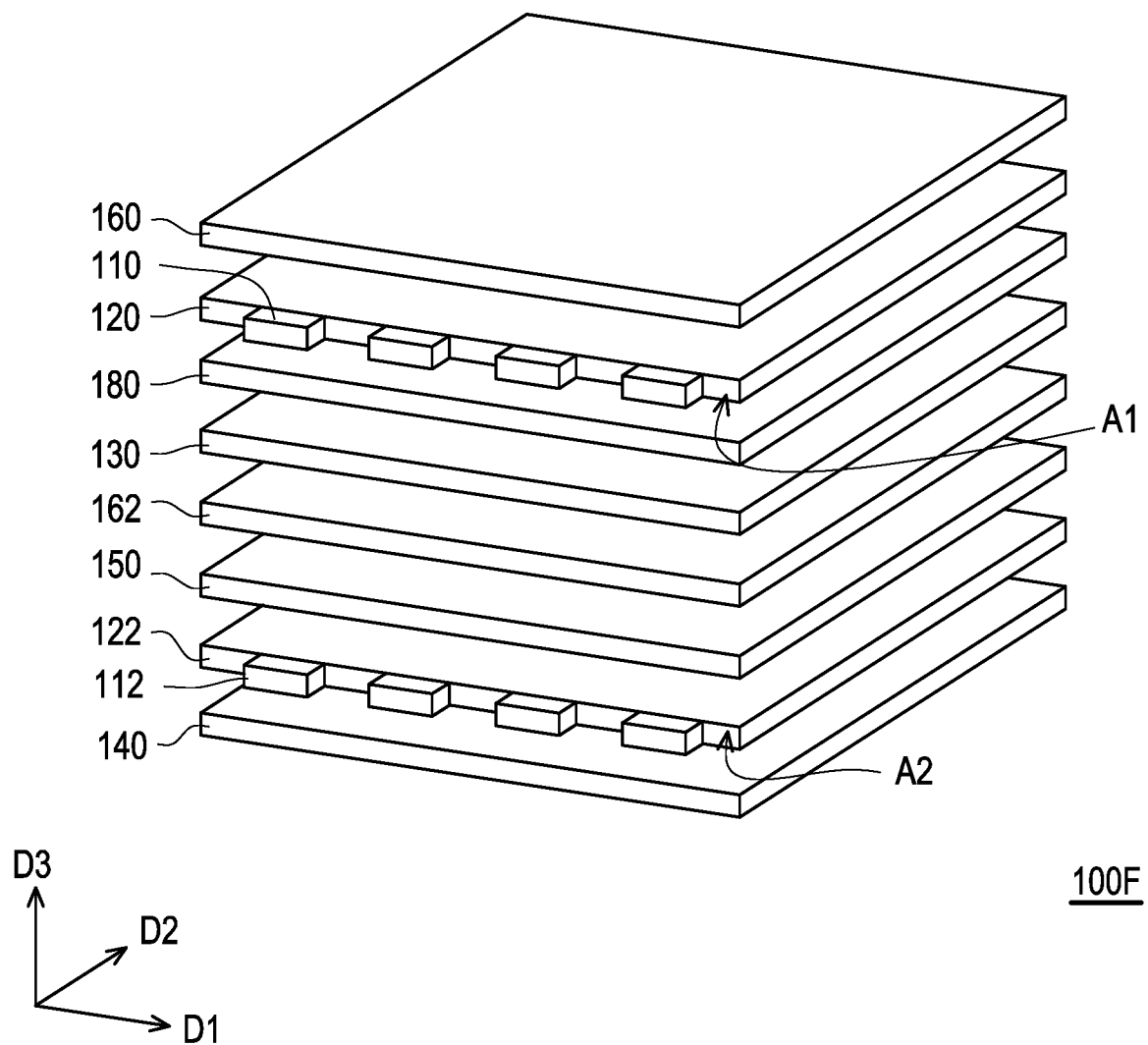
FIG. 8 is a schematic diagram of a backlight module according to another embodiment of the invention.
Figure 9:
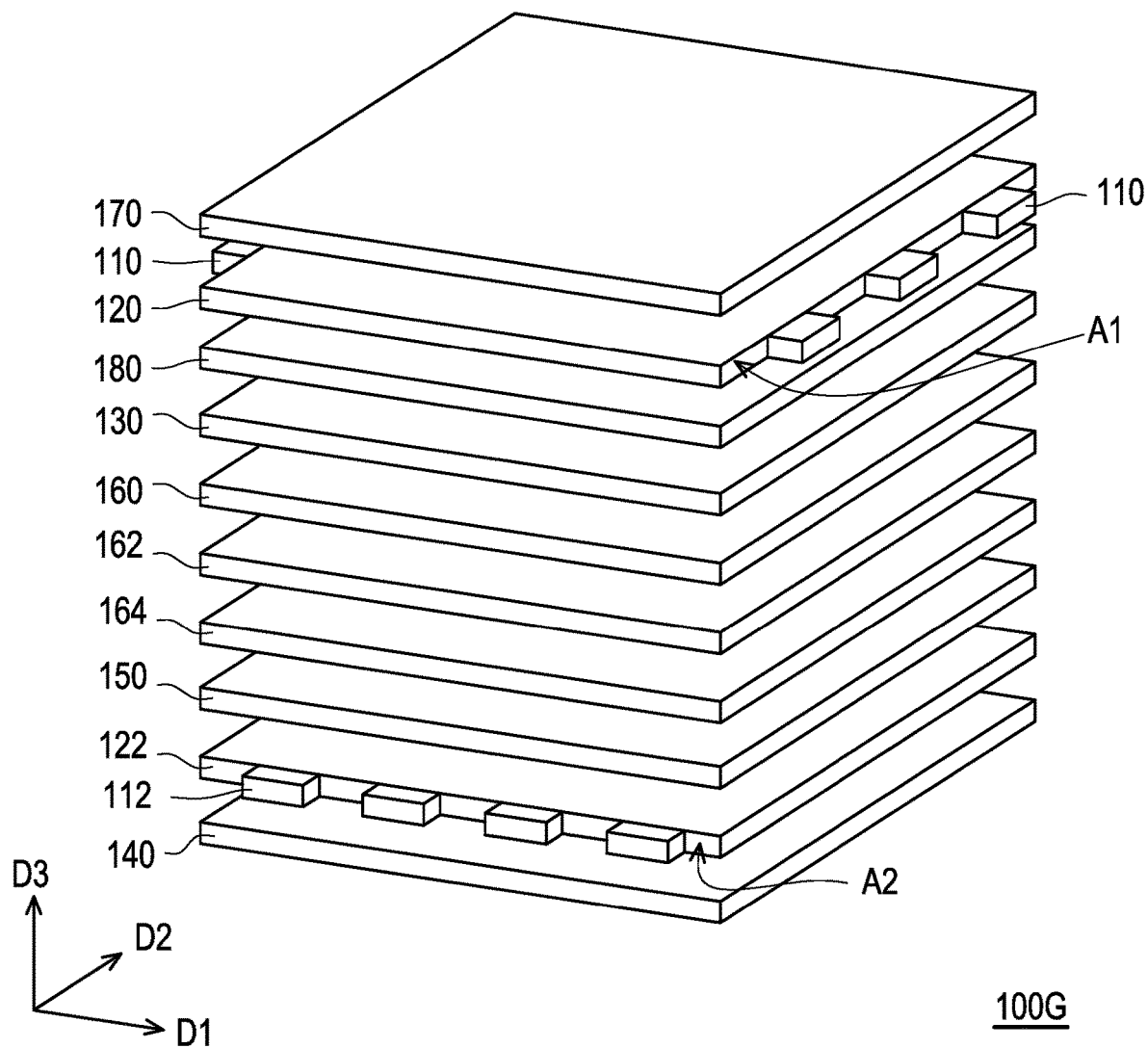
FIG. 9 is a schematic diagram of a backlight module according to another embodiment of the invention.

FIG. 8 is a schematic diagram of a backlight module according to another embodiment of the invention. FIG. 9 is a schematic diagram of a backlight module according to another embodiment of the invention. Referring to FIG. 8, a backlight module 100F of the embodiment is similar to the backlight module 100 shown in FIG. 1, and a difference there between is that in the embodiment, the backlight module 100F further includes a second reflective brightness enhancement film 180, which may be a dual brightness enhancement film (DBEF), an advanced polarization conversion film (APCF) or a semi-reflective film, and is disposed between the light guide plate 120 and the light control film 130 to re-reflect a part of light emitted downward from the first light guide plate 120 to reduce the absorption by the light control film 130, thereby increasing the brightness of the backlight module 100F in the sharing mode. Similar to the difference between the backlight module 100 of FIG. 1 and the backlight module 100F of FIG. 8, regarding a backlight module 100G shown in FIG. 9, the backlight module 100A of FIG. 3A may be modified according to the implementation of the embodiment of FIG. 8 to obtain the backlight module 100G of FIG. 9, but the invention is not limited thereto.

Figure 10:
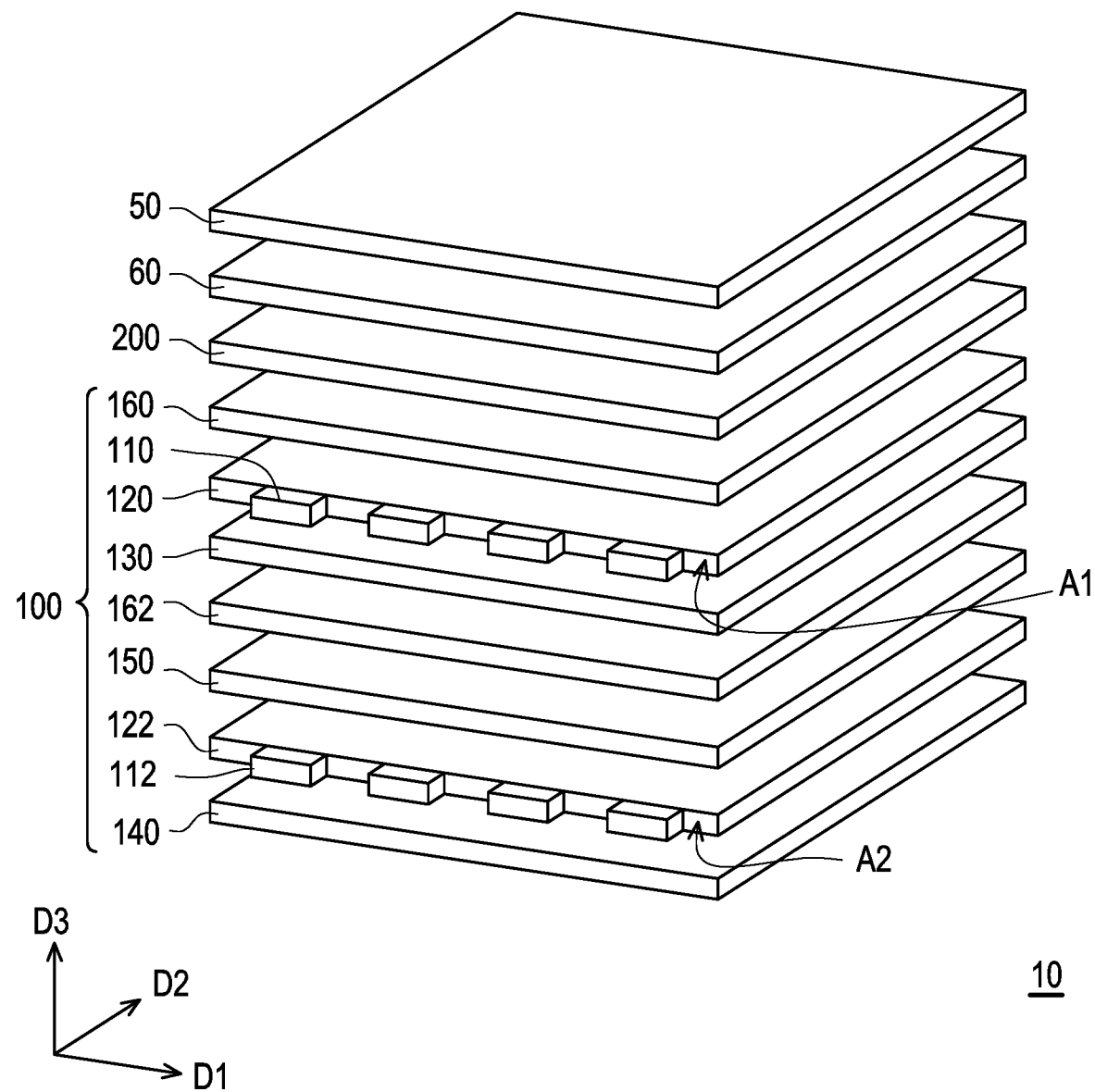
FIG. 10 is a schematic diagram of a display device according to an embodiment of the invention.
Figure 11:
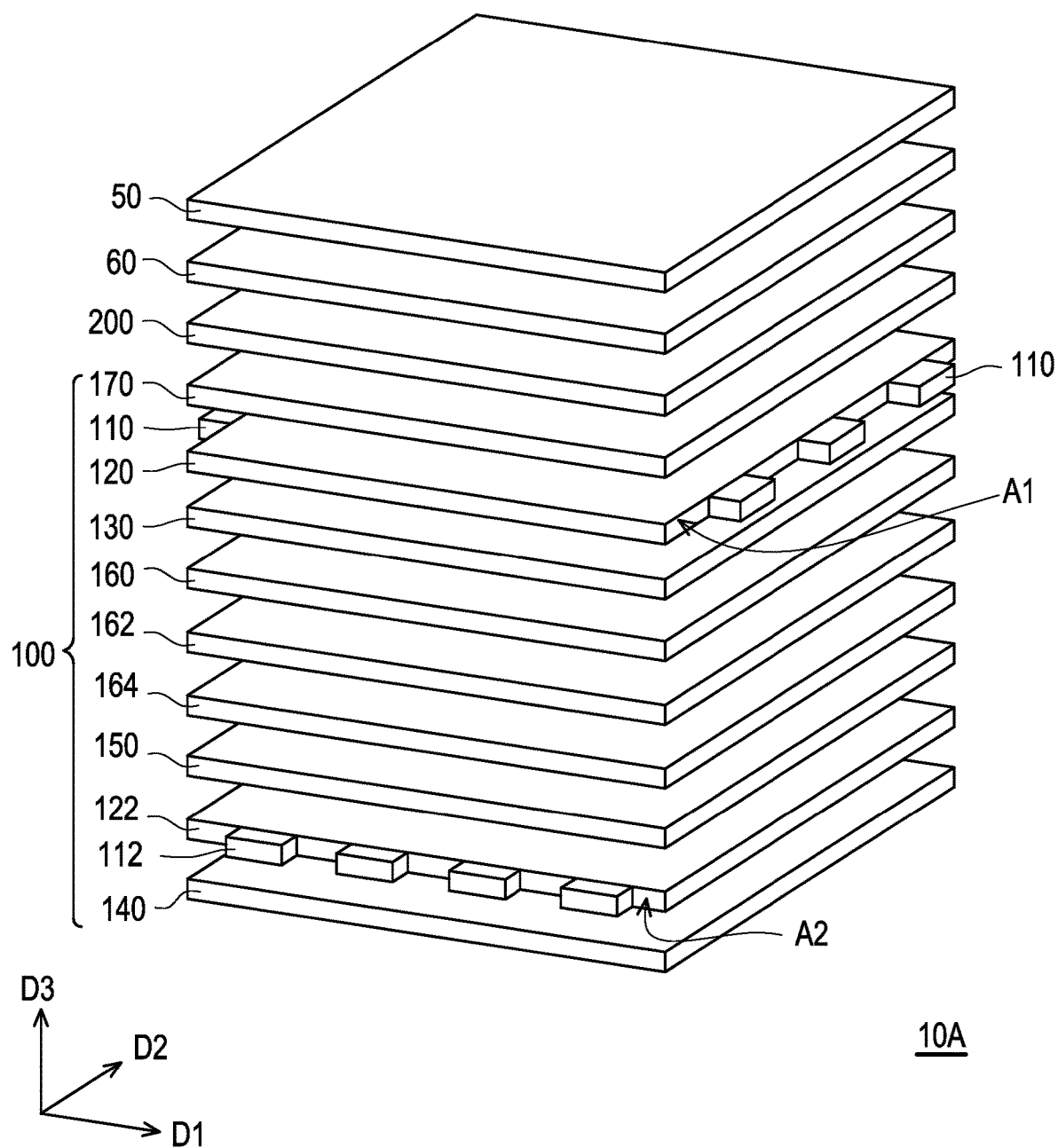
FIG. 11 is a schematic diagram of a display device according to another embodiment of the invention.

FIG. 10 is a schematic diagram of a display device according to an embodiment of the invention. FIG. 11 is a schematic diagram of a display device according to another embodiment of the invention. Referring to FIG. 10 first, the embodiment provides a display device 10 for providing a display light beam. The display device 10 includes a display module 50, a backlight module 100, a liquid crystal element 200 and a half-wave retardation film 60. The display module 50 is, for example, a Liquid Crystal Display (LCD). The backlight module 100 may be implemented by the backlight module 100 shown in FIG. 1, and the display module 50 is disposed on a side of the backlight module 100 where the first light guide plate 120 is away from the light control film 130. The liquid crystal element 200 is located between the display module 50 and the first light guide plate 120 for controlling a viewing angle to achieve a better anti-peeping effect. The half-wave retardation film 60 is located between the display module 50 and the liquid crystal element 200, and the number of the half-wave retardation film 60 is one piece. It should be noted that, in one embodiment, both sides of the half-wave retardation film 60 can be directly attached to the display module 50 and the liquid crystal element 200. In another embodiment, one side of the half-wave retardation film 60 can be attached to one of the display module 50 and the liquid crystal element 200, and the other side of the half-wave retardation film 60 does not need to be in contact with the other one of the display module 50 and the liquid crystal element 200. In other words, there is an air layer between the other side of the half-wave retardation film 60 and the other one of the display module 50 and the liquid crystal element 200. Similar to the display device 10 in FIG. 10, the backlight module 100A in the display device 10A shown in FIG. 11 may be implemented by the backlight module 100A in FIG. 3A, and the invention is not limited thereto.

Figure 12:
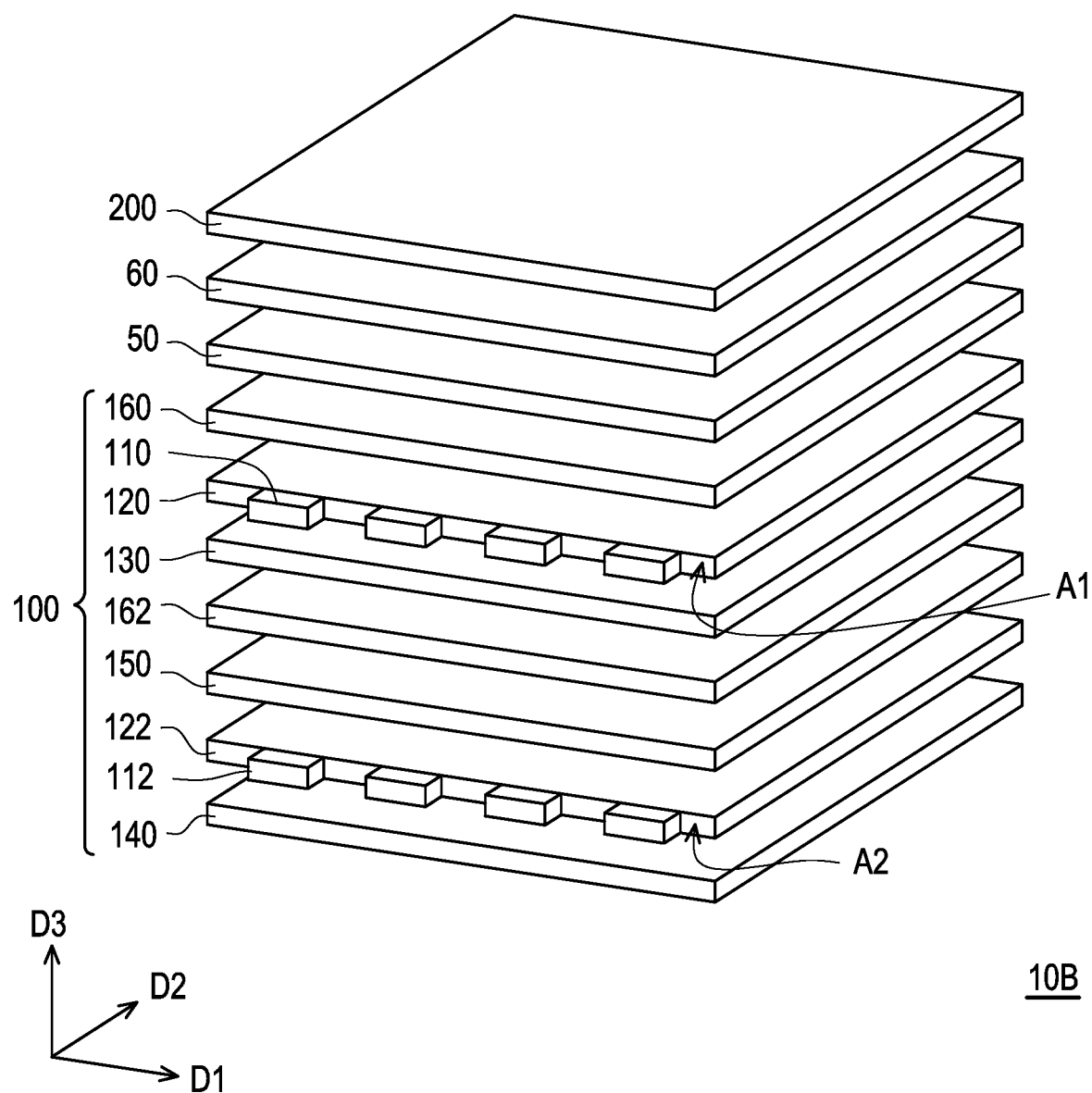
FIG. 12 is a schematic diagram of a display device according to another embodiment of the invention.
Figure 13:
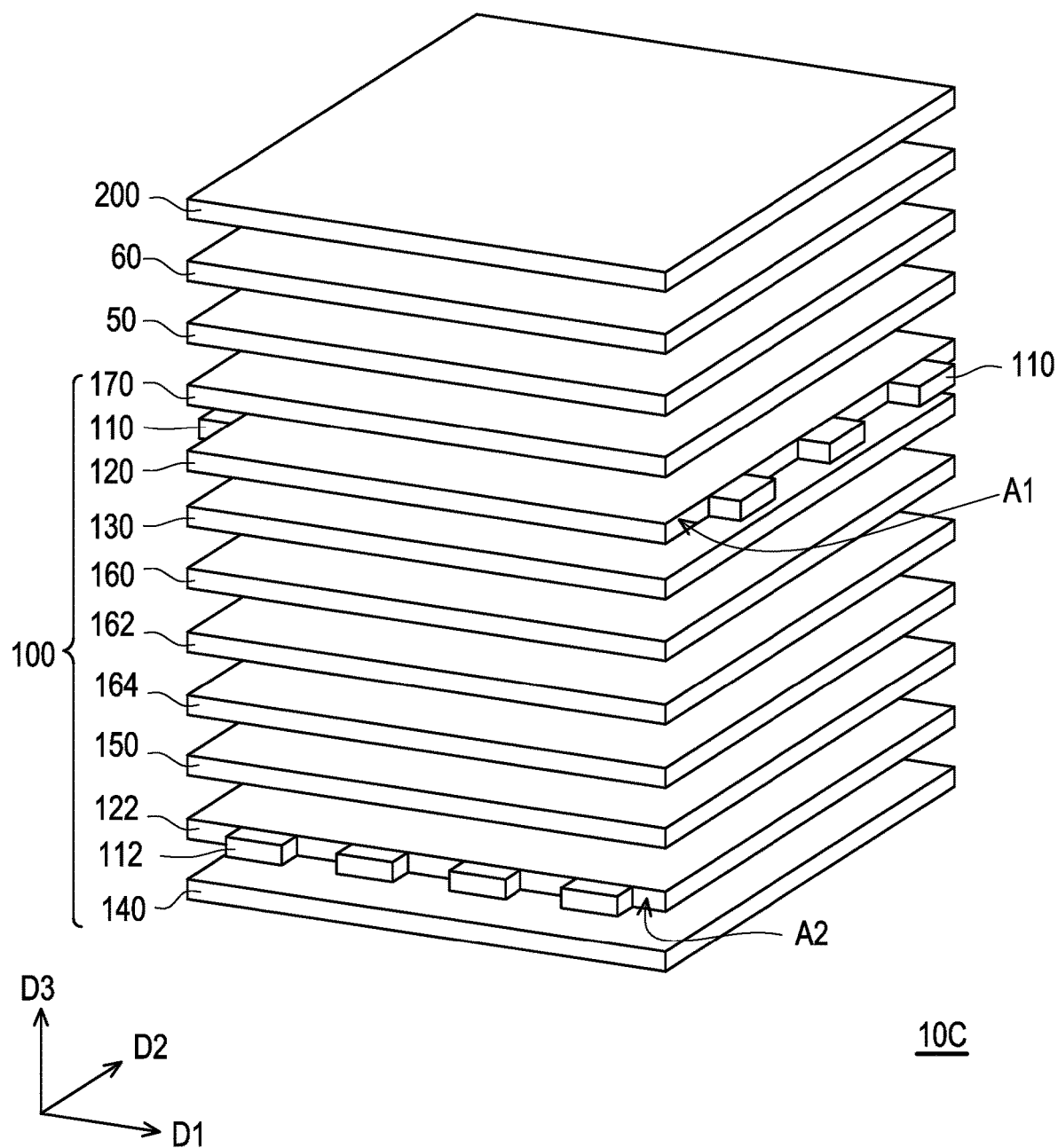
FIG. 13 is a schematic diagram of a display device according to another embodiment of the invention.

FIG. 12 is a schematic diagram of a display device according to another embodiment of the invention. FIG. 13 is a schematic diagram of a display device according to another embodiment of the invention. Display devices 10B and 10C shown in FIG. 12 and FIG. 13 are similar to the display devices 10 and 10A shown in FIG. 10 and FIG. 11. A difference there between is that, in the embodiments shown in FIG. 12 and FIG. 13, the display module 50 is located between the liquid crystal element 200 and the first light guide plate 120 to control the viewing angle to achieve a better anti-peeping effect.

Figure 14:
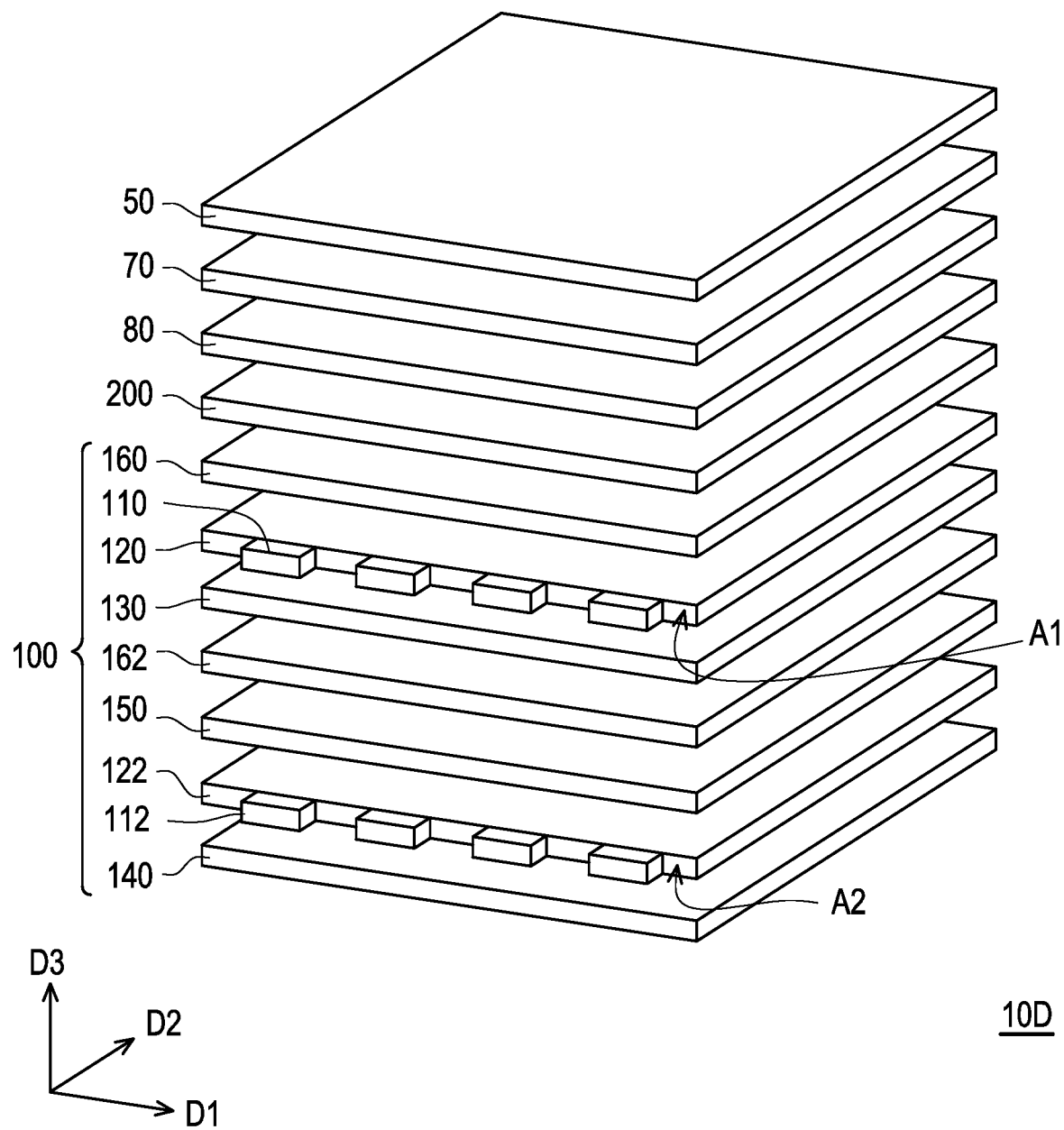
FIG. 14 is a schematic diagram of a display device according to another embodiment of the invention.
Figure 15:
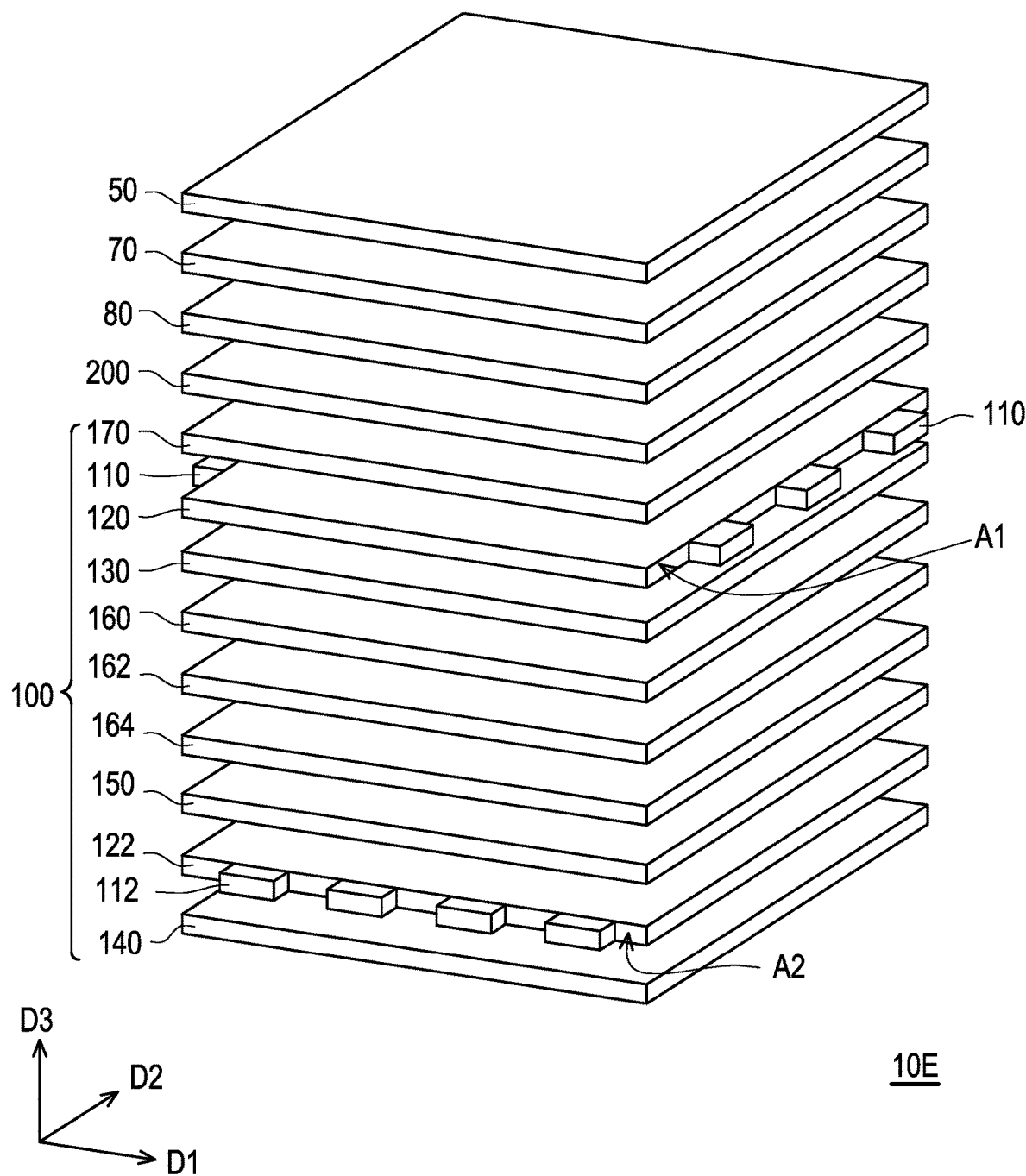
FIG. 15 is a schematic diagram of a display device according to another embodiment of the invention.
Figure 16:
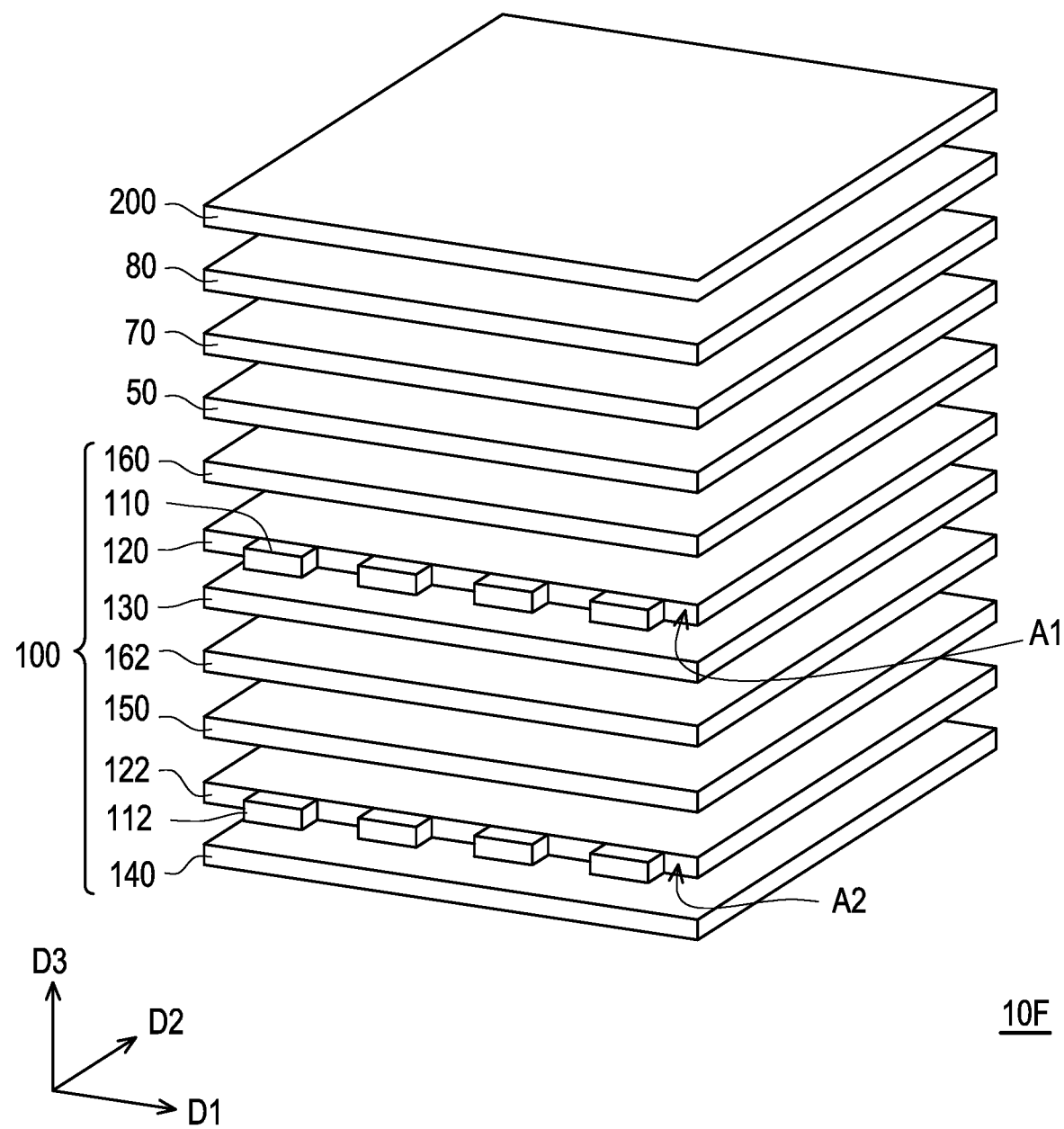
FIG. 16 is a schematic diagram of a display device according to another embodiment of the invention.
Figure 17:
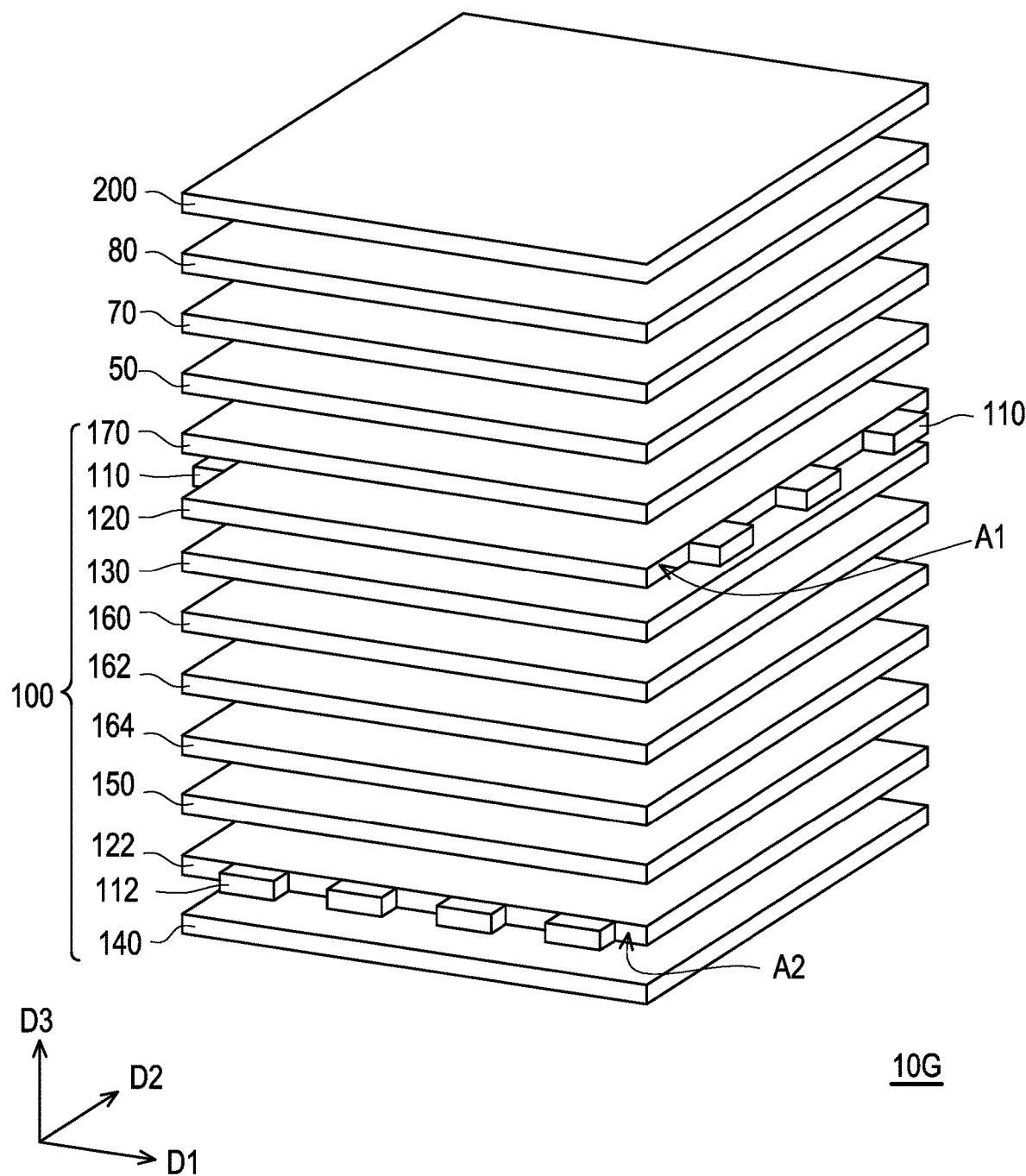
FIG. 17 is a schematic diagram of a display device according to another embodiment of the invention.

FIG. 14 is a schematic diagram of a display device according to another embodiment of the invention. FIG. 15 is a schematic diagram of a display device according to another embodiment of the invention. FIG. 16 is a schematic diagram of a display device according to another embodiment of the invention. FIG. 17 is a schematic diagram of a display device according to another embodiment of the invention. Display devices 10D, 10E, 10F and 10G shown in FIG. 14 to FIG. 17 are similar to the display devices 10, 10A, 10B and 10C shown in FIG. 10 to FIG. 13. A difference there between is that, in the embodiments shown in FIG. 14 to FIG. 17, the display devices 10D, 10E, 10F, and 10G do not include a half-wave retardation film. Instead, the display devices 10D, 10E, 10F, and 10G have a first quarter-wave retardation film 70 and a second quarter-wave retardation film 80. The first quarter-wave retardation film 70 and the second quarter-wave retardation film 80 are both located between the display module 50 and the liquid crystal element 200. The first quarter-wave retardation film 70 is directly attached to the display module 50, the second quarter-wave retardation film 80 is directly attached to the liquid crystal element 200, and the first quarter-wave retardation film 70 and the second quarter-wave retardation film 80 are not in contact with each other. In other words, there is an air layer between the first quarter-wave retardation film 70 and the second quarter-wave retardation film 80. It should be further explained that an anti-adsorption layer can be provided on one side of the two quarter-wave retardation films facing the air layer. The haze of the anti-adsorption layer needs to be less than 30%, and in a preferred embodiment is less than 10%.

Figure 18:
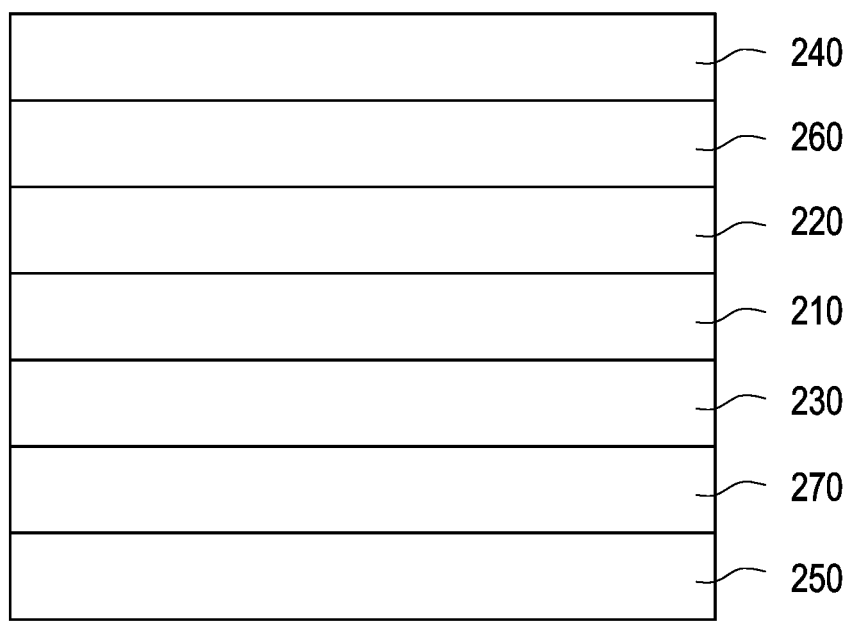
FIG. 18 is a layered schematic diagram of a liquid crystal element according to an embodiment of the invention.
Figure 18:
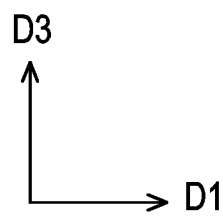

FIG. 18 is a layered schematic diagram of a liquid crystal element according to an embodiment of the invention. The liquid crystal element 200 disclosed in FIG. 18 is adapted to the embodiments disclosed in FIG. 10 to FIG. 17. The liquid crystal element 200 includes a liquid crystal layer 210, a first alignment layer 220, a second alignment layer 230, a first polarizing layer 240 and a second polarizing layer 250. The liquid crystal layer 210 is disposed between the first alignment layer 220 and the second alignment layer 230. The first alignment layer 220 is disposed between the first polarizing layer 240 and the liquid crystal layer 210. The second alignment layer 230 is disposed between the second polarizing layer 250 and the liquid crystal layer 210. It should be noted that in the embodiments disclosed in FIG. 10 to FIG. 11 and FIG. 14 to FIG. 15, the first polarizing layer 240 is located between the display module 50 and the liquid crystal layer 210. In the embodiments disclosed in FIG. 12 to FIG. 13 and FIG. 16 to FIG. 17, the second polarizing layer 250 is located between the display module 50 and the liquid crystal layer 210. In addition, the liquid crystal element 200 may include a first compensation film 260 and a second compensation film 270. The first compensation film 260 is disposed between the first polarizing layer 240 and the first alignment layer 220, and the second compensation film 270 is disposed between the second polarizing layer 250 and the second alignment layer 230. However, the liquid crystal element 200 can also contain only one compensation film. For example, a compensation film can be disposed between the first polarizing layer 240 and the first alignment layer 220, or a compensation film can be disposed between the second polarizing layer 250 and the second alignment layer 230. An embodiment of a compensation film is not otherwise shown in the drawings. Regardless of whether the number of compensation films is two or one, the sum of the out-of-plane phase retardation values (Rth) of the compensation films is less than or equal to −50 nm. The formula of out-of-plane phase retardation is Rth=((nx+ny)/2−nz)*d, wherein nx and ny are the refractive index in the plane direction of the compensation film, nz is the refractive index perpendicular to the direction of the compensation film, and d is the thickness of the compensation film. In addition, the compensation film is, for example, a C-plate or a biaxial film. The liquid crystal layer 210 is, for example, a twisted nematic (TN) liquid crystal, which has a high optical phase difference (And), and the optical phase difference is, for example, 1.0 μm to 1.1 μm. For example, for a light with a wavelength of 550 nm, the optical phase difference is 1.08 μm. It should be further explained that the angle between the alignment direction of the first alignment layer 220 and the alignment direction of the second alignment layer 230 is, for example, 90 degrees. For example, the alignment direction of the first alignment layer 220 is 315 degrees, the alignment direction of the second alignment layer 230 is 225 degrees, the absorption axis angle of the first polarizing layer 240 is 135 degrees, and the absorption axis angle of the second polarizing layer 250 is 45 degrees. Regarding the embodiments disclosed in FIG. 14 and FIG. 15, the second quarter-wave retardation film 80 is attached to the first polarizing layer 240 of the liquid crystal element 200, and the first quarter-wave retardation film 70 is attached to the display module 50. The display module 50 includes polarizer. In other words, the first quarter-wave retardation film 70 is essentially attached to the polarizer of the display module 50. For example, the angle between the absorption axis of the polarizer of the display module 50 and the first direction D1 is the first angle, and the optimal angle of the optical axis of the first quarter-wave retardation film 70 attached to the polarizer of the display module 50 is the first angle plus 45 degrees. The angle between the absorption axis of the first polarizing layer 240 of the liquid crystal element 200 and the first direction D1 is the second angle, and the optimal angle of the optical axis of the second quarter-wave retardation film 80 attached to the first polarizing layer 240 of the liquid crystal element 200 is the second angle minus 45 degrees. Regarding the embodiments disclosed in FIG. 16 and FIG. 17, the second quarter-wave retardation film 80 is attached to the second polarizing layer 250 of the liquid crystal element 200, and the first quarter-wave retardation film 70 is attached to the display module 50. For example, the angle between the absorption axis of the polarizer of the display module 50 and the first direction D1 is the first angle, and the optimal angle of the optical axis of the first quarter-wave retardation film 70 attached to the polarizer of the display module 50 is the first angle plus 45 degrees. The angle between the absorption axis of the second polarizing layer 250 of the liquid crystal element 200 and the first direction D1 is the third angle, and the optimal angle of the optical axis of the second quarter-wave retardation film 80 attached to the second polarizing layer 250 of the liquid crystal element 200 is the third angle minus 45 degrees.

Figure 19:
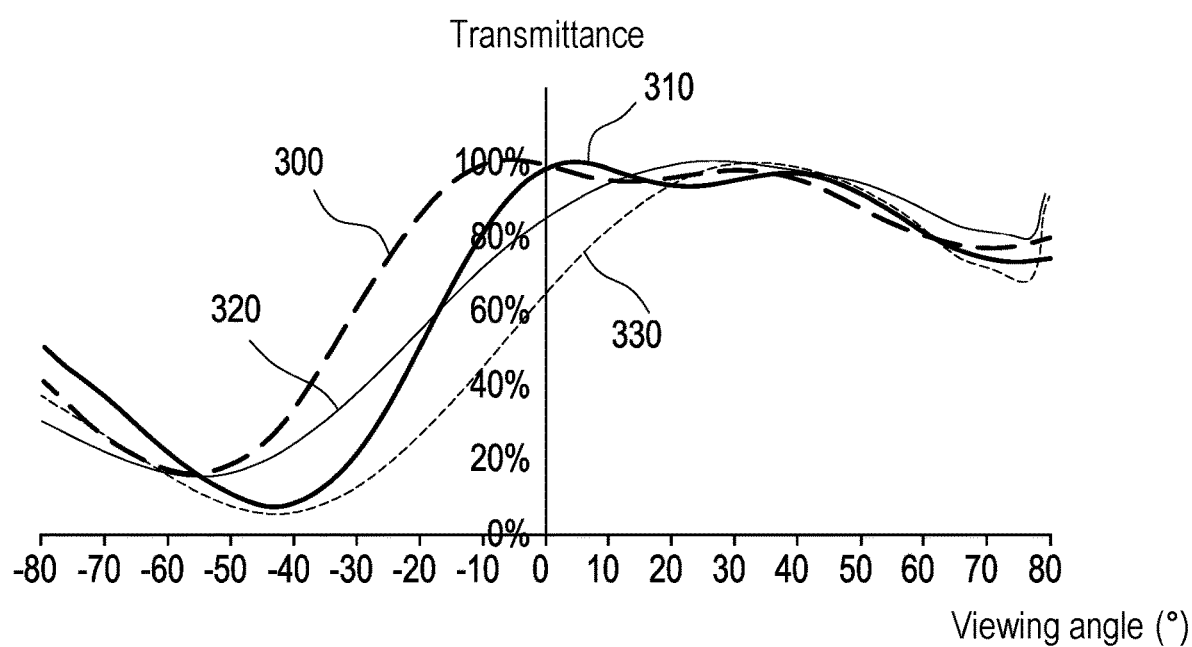
FIG. 19 is a diagram illustrating transmittance-horizontal viewing angle curves of display devices of different embodiments of the invention.

FIG. 19 is a diagram illustrating transmittance-horizontal viewing angle curves of the display devices of different embodiments of the invention. Referring to FIG. 19, a curve 300 is a transmittance-viewing angle change of the liquid crystal element 200 (as shown in FIG. 10 to FIG. 13) with a high refractive index difference characteristic (i.e. a difference between a refractive index perpendicular to a long axis direction of the liquid crystal molecules and a refractive index parallel to the long axis direction of the liquid crystal molecules) at a voltage of 3.52V, a curve 310 is a transmittance-viewing angle change of the liquid crystal element 200 with the high refractive index difference characteristic at a voltage of 3.96V, a curve 320 is a transmittance-viewing angle change of the liquid crystal element 200 with a low refractive index difference characteristic at a voltage of 1.8V, and a curve 330 is a transmittance-viewing angle change of the liquid crystal element 200 with the low refractive index difference characteristic at a voltage of 2.05V. As shown in FIG. 14, to increase a refractive index difference of the liquid crystal element 200 may make the transmittance-horizontal viewing angle curve steeper, which helps to improve the brightness of the anti-peeping mode and enhance the anti-peeping effect. It should be further explained that when the liquid crystal element 200 includes a compensation film, it may effectively avoid a sharp rise of the curve from minus 40 degrees to minus 80 degrees of the viewing angle in FIG. 14, which may achieve the effect of suppressing large angle light leakage in the anti-peeping direction.

In summary, in the backlight module and the display device of the invention, the backlight module includes the first light emitting unit, the first light guide plate, the second light emitting unit, the second light guide plate and the light control film. The light control film is disposed between the first light guide plate and the second light guide plate, and has the plurality of light-shielding microstructures arranged along the first direction and extending along the second direction, which is configured to effectively reduce a light intensity of a large horizontal viewing angle after the light beam passes through the light control film, so as to achieve the anti-peeping effect. Therefore, when the first light guide plate is lighted, the display device may be in the sharing mode, and when only the second light guide plate is lighted, the display device may be in the anti-peeping mode. In this way, it may be conveniently switched to the sharing mode or the anti-peeping mode without additionally configuring an anti-peeping optical element on the display, which maintains a good display brightness of the display device, and avoids the optical interference phenomenon caused by configuration of the anti-peeping optical element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising a first light emitting unit, a first light guide plate, a second light emitting unit, a second light guide plate, a light control film, a first prism sheet, a second prism sheet and a third prism sheet, wherein:
   the first light emitting unit is disposed on a first side surface of the first light guide plate;
   the second light emitting unit is disposed on a second side surface of the second light guide plate;
   the light control film is disposed between the first light guide plate and the second light guide plate, the light control film has a plurality of light-shielding microstructures arranged along a first direction and extending along a second direction, and the first direction is perpendicular to the second direction;
   the second prism sheet is located between the light control film and the second light guide plate, and has a plurality of second prism structures on a side away from the second light guide plate;
   the first prism sheet is located on a side of the first light guide plate away from the light control film or disposed between the light control film and the second prism sheet, and has a plurality of first prism structures on the side away from the second light guide plate; and
   the third prism sheet is disposed between the second prism sheet and the second light guide plate, and has a plurality of third prism structures on a side facing the second light guide plate.

2. The backlight module as claimed in claim 1, wherein the first side surface is perpendicular to the second side surface.

3. The backlight module as claimed in claim 1, further comprising a reflector, wherein the second light guide plate is located between the first light guide plate and the reflector.

4. The backlight module as claimed in claim 1, further comprising a first diffuser disposed between the light control film and the second light guide plate.

5. The backlight module as claimed in claim 1, further comprising a first reflective brightness enhancement film or a second diffuser disposed on a side of the first light guide plate away from the light control film.

6. The backlight module as claimed in claim 1, wherein an extending direction of the plurality of first prism structures is perpendicular to an extending direction of the plurality of second prism structures.

7. The backlight module as claimed in claim 6, wherein an angle range of a vertex angle of each of the plurality of first prism structures is 40 to 80 degrees, and an angle range of a vertex angle of each of the plurality of second prism structures is 70 to 120 degrees.

8. The backlight module as claimed in claim 1, wherein an extending direction of the plurality of third prism structures is parallel to or perpendicular to the extending direction of the plurality of first prism structures.

9. The backlight module as claimed in claim 1, wherein an angle range of a vertex angle of each of the plurality of first prism structures is 70 to 120 degrees, and an angle range of a vertex angle of each of the plurality of second prism structures is 40 to 80 degrees.

10. The backlight module as claimed in claim 1, further comprising a second reflective brightness enhancement film disposed between the first light guide plate and the light control film.

11. A display device, configured to provide a display light beam, and comprising a backlight module and a display module, wherein
the backlight module comprises a first light emitting unit, a first light guide plate, a second light emitting unit, a second light guide plate, a light control film, a first prism sheet, a second prism sheet and a third prism sheet, wherein:
the first light emitting unit is disposed on a first side surface of the first light guide plate;
the second light emitting unit is disposed on a second side surface of the second light guide plate;
the light control film is disposed between the first light guide plate and the second light guide plate, the light control film has a plurality of light-shielding microstructures arranged along a first direction and extending along a second direction, and the first direction is perpendicular to the second direction;
the second prism sheet is located between the light control film and the second light guide plate, and has a plurality of second prism structures on a side away from the second light guide plate;
the first prism sheet is located on a side of the first light guide plate away from the light control film or disposed between the light control film and the second prism sheet, and has a plurality of first prism structures on the side away from the second light guide plate; and
the third prism sheet is disposed between the second prism sheet and the second light guide plate, and has a plurality of third prism structures on a side facing the second light guide plate,
the display module is disposed on a side of the first light guide plate away from the light control film.

12. The display device as claimed in claim 11, further comprising a liquid crystal element disposed between the display module and the first light guide plate.

13. The display device as claimed in claim 11, further comprising a liquid crystal element, wherein the display module is disposed between the liquid crystal element and the first light guide plate.

\* \* \* \* \*